(12) United States Patent
Miki et al.

(10) Patent No.: US 6,424,662 B1
(45) Date of Patent: Jul. 23, 2002

(54) ROUTER APPARATUS USING ATM SWITCH

(75) Inventors: Kazuho Miki; Masahiro Takatori, both of Yokohama; Akihiko Takase, Tokyo; Masaru Murakami, Yokohama; Koji Wakayama, Yokohama; Tetsuro Yoshimoto, Yokohama; Masao Kunimoto, Chigasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/498,353

(22) Filed: Feb. 4, 2000

Related U.S. Application Data

(63) Continuation of application No. 09/028,830, filed on Feb. 13, 1998, now Pat. No. 6,046,999, which is a continuation-in-part of application No. 08/923,873, filed on Sep. 2, 1997, now Pat. No. 5,963,555.

(30) Foreign Application Priority Data

| Sep. 3, 1996 | (JP) | ............................................. 8-233045 |
| Feb. 14, 1999 | (JP) | ............................................. 9-030643 |

(51) Int. Cl.[7] .............................................. H04L 12/56
(52) U.S. Cl. ...................................... 370/535; 370/466
(58) Field of Search ................................ 370/395, 401, 370/466, 396, 397, 398, 399, 400, 464, 476, 471, 474, 392, 389, 535, 465, 538, 351, 352, 402, 403, 428, 395.2, 395.21, 395.31, 395.51, 395.52, 395.53, 395.61, 395.65, 395.71, 537

(56) References Cited

U.S. PATENT DOCUMENTS 4,736,363 A 4/1988 Aubin et al.

(List continued on next page.)

FOREIGN PATENT DOCUMENTS

| JP | 4260245 | 9/1992 |
| JP | 4276943 | 10/1992 |
| JP | 779224 | 3/1995 |
| JP | 8125692 | 5/1996 |
| JP | 9181740 | 7/1997 |
| JP | 9247169 | 9/1997 |

OTHER PUBLICATIONS

Cisco Systems "ATM Internetworking", by Anthony Alles, p. 121, Sep. 1995.

(List continued on next page.)

Primary Examiner—Dang Ton
(74) Attorney, Agent, or Firm—Antonelli, Terry, Stout & Kraus, LLP

(57) ABSTRACT

A router apparatus 5 is provided with an ATM switch, an IP controller for performing routing control as a controller for layer 3, plural kinds of interfaces which are individually provided to plural transmission paths in which various communications are performed, and a cell multiplexing/demultiplexing unit, and manages the cell communications between respective parts on the basis of identification information. The input packet is subjected to IP processing in an interface to be converted to a cell in a common format, and the cell is serially multiplexed with a cell from another interface on a cell basis, and transmitted to the ATM switch at the cell multiplexing/demultiplexing unit. Each interface and each cell multiplexing/demultiplexing unit sets and switches the identification information for the header portion of the packet and the cell to be communicated by using a table in which the corresponding relationship of the identification information is registered.

7 Claims, 47 Drawing Sheets

U.S. PATENT DOCUMENTS

| | | | |
|---|---|---|---|
| 4,939,726 A | | 7/1990 | Flammer et al. |
| 5,042,027 A | | 8/1991 | Takase et al. |
| 5,313,454 A | | 5/1994 | Bustini et al. ............... 370/231 |
| 5,430,727 A | | 7/1995 | Callon ........................ 370/401 |
| 5,452,293 A | | 9/1995 | Wilkinson et al. |
| 5,485,455 A | | 1/1996 | Dobbins et al. |
| 5,572,678 A | | 11/1996 | Homma et al. |
| 5,623,605 A | | 4/1997 | Keshau et al. ......... 395/200.17 |
| 5,663,959 A | | 9/1997 | Nakagawa |
| 5,675,576 A | | 10/1997 | Kalampoukas et al. |
| 5,835,710 A | | 11/1998 | Nagami et al. .......... 395/200.8 |
| 5,917,820 A | | 6/1999 | Rekhter |
| 5,963,555 A | * | 10/1999 | Takase et al. ............... 370/395 |
| 6,046,999 A | * | 4/2000 | Miki et al. .................. 370/395 |
| 6,075,787 A | * | 6/2000 | Bobeck et al. .............. 370/395 |
| 6,108,304 A | | 8/2000 | Abe et al. |

OTHER PUBLICATIONS

"Multiprotocol Encapsulation Over ATM Adaptation Layer 5", Juha Heinanen, Request for Comments: 1483, Jul. 1993.

"Data Structure and Algorithm" Baifukan Co., Ltd., p. 239, Mar. 1987.

"ABR Flow Control", Traffic Management Specification Version 4.0.

"The PPP Multilink Protocol (MP)", K. Sklower, et al., Aug. 1996.

"ATM Forum UNI version 3.1", PTR Prentice Hall Prentice–Hall, Inc. 1995.

*IEEE Network*, "RSVP: A New Resource Reservation Protocol", Lixia Zhang, et al., Sep. 1993.

Y. Sakakibara, "Appearance of a router directed to a large–scale network, which utilizes switching technique", Nikkei Open Systems, No. 44, Nov. 15, 1996, pp. 208–210.

M. Yoneada, "Next generation high–speed router, ATM implementation will mean a difference", Nikkei Communications, No. 225, Jul. 1, 1996. pp. 85–91.

* cited by examiner

FIG.5

| PHYSICAL PORT NUMBER | SWITCH PORT NUMBER | MULTIPLEX PORT NUMBER | default VC | | | redirect VC | | |
|---|---|---|---|---|---|---|---|---|
| | | | LOCAL IDENTIFIER | INSIDE CONNECTION IDENTIFIER | VPI/VCI | LOCAL IDENTIFIER | INSIDE CONNECTION IDENTIFIER | VPI/VCI |
| 1 | 1 | - | - | 16~86 | (0,16)~(0,86) | - | 128~4095 | (0,128)~(0,4095) |
| 2 | 2 | - | - | 1 | (0,15) | - | 16~4095 | (0,16)~(0,4095) |
| ⋮ | ⋮ | ⋮ | ⋮ | ⋮ | ⋮ | ⋮ | ⋮ | ⋮ |
| 8 | 8 | - | - | 1 | (0,15) | - | 16~4095 | (0,16)~(0,4095) |
| 9 | 9 | 1 | 1 | 1 | (0,15) | 2~128 | 2~128 | (0,16)~(0,142) |
| | 10 | 2 | 1 | 129 | (0,15) | 2~128 | 130~256 | (0,16)~(0,142) |
| | ⋮ | ⋮ | ⋮ | ⋮ | ⋮ | ⋮ | ⋮ | ⋮ |
| 10 | 24 | 16 | 1 | 1921 | (0,15) | 2~128 | 1922~2048 | (0,16)~(0,142) |
| | 25 | 1 | 1 | 1 | (0,15) | 2~128 | 2~128 | (0,16)~(0,142) |
| | ⋮ | ⋮ | ⋮ | ⋮ | ⋮ | ⋮ | ⋮ | ⋮ |
| 11 | 40 | 16 | 1 | 1921 | (0,15) | 2~128 | 1922~2048 | (0,16)~(0,142) |
| | 41 | 1 | 1 | 1 | (0,15) | 2~128 | 2~128 | (0,16)~(0,142) |
| | ⋮ | ⋮ | ⋮ | ⋮ | ⋮ | ⋮ | ⋮ | ⋮ |
| 12 | 56 | 16 | 1 | 1921 | (0,15) | 2~128 | 1922~2048 | (0,16)~(0,142) |
| | 57 | 1 | 1 | 1 | (0,15) | 2~128 | 2~128 | (0,16)~(0,142) |
| | ⋮ | ⋮ | ⋮ | ⋮ | ⋮ | ⋮ | ⋮ | ⋮ |
| | 72 | 16 | 1 | 1921 | (0,15) | 2~128 | 1922~2048 | (0,16)~(0,142) |

FIG.11

| IP FLOW IDENTIFIER | LOCAL IDENTIFIER |
|---|---|
| (x.x.x.x,y.y.y.y) | 2 |
| ... | ... |

↕ FOR REDIRECT VC

FIG.12

| MULTIPLEX PORT NUMBER | LOCAL IDENTIFIER | OUTPUT PHYSICAL PORT NUMBER | INSIDE CONNECTION IDENTIFIER | |
|---|---|---|---|---|
| 1 | 1 | 1 | 23 | ↕ FOR DEFAULT VC |
| 2 | 1 | 1 | 24 | |
| ... | ... | ... | ... | |
| 16 | 1 | 1 | 38 | |
| 1 | 2 | 1→2 | 128→16 | ↕ FOR REDIRECT VC |
| ... | ... | ... | ... | |

FIG.15

| VPI/VCI | OUTPUT PHYSICAL PORT NUMBER | INSIDE CONNECTION IDENTIFIER | |
|---|---|---|---|
| ... | ... | ... | |
| (0,15) | 0 | 15 | |
| (0,16) | 2 | 1 | |
| ... | ... | ... | FOR DEFAULT VC |
| (0,22) | 8 | 1 | |
| (0,23) | 9 | 1 | |
| (0,24) | 9 | 129 | ATM INTERFACE 523B FOR GSMP |
| ... | ... | ... | |
| (0,38) | 9 | 1921 | ATM INTERFACE 523H |
| ... | ... | ... | |
| (0,86) | 12 | 1921 | CELL MULTIPLEXING/ DEMULTIPLEXING UNIT 511A |
| ... | ... | ... | |
| (0,128) | - | - | |
| ... | ... | ... | FOR REDIRECT VC |
| (0,4095) | - | - | |

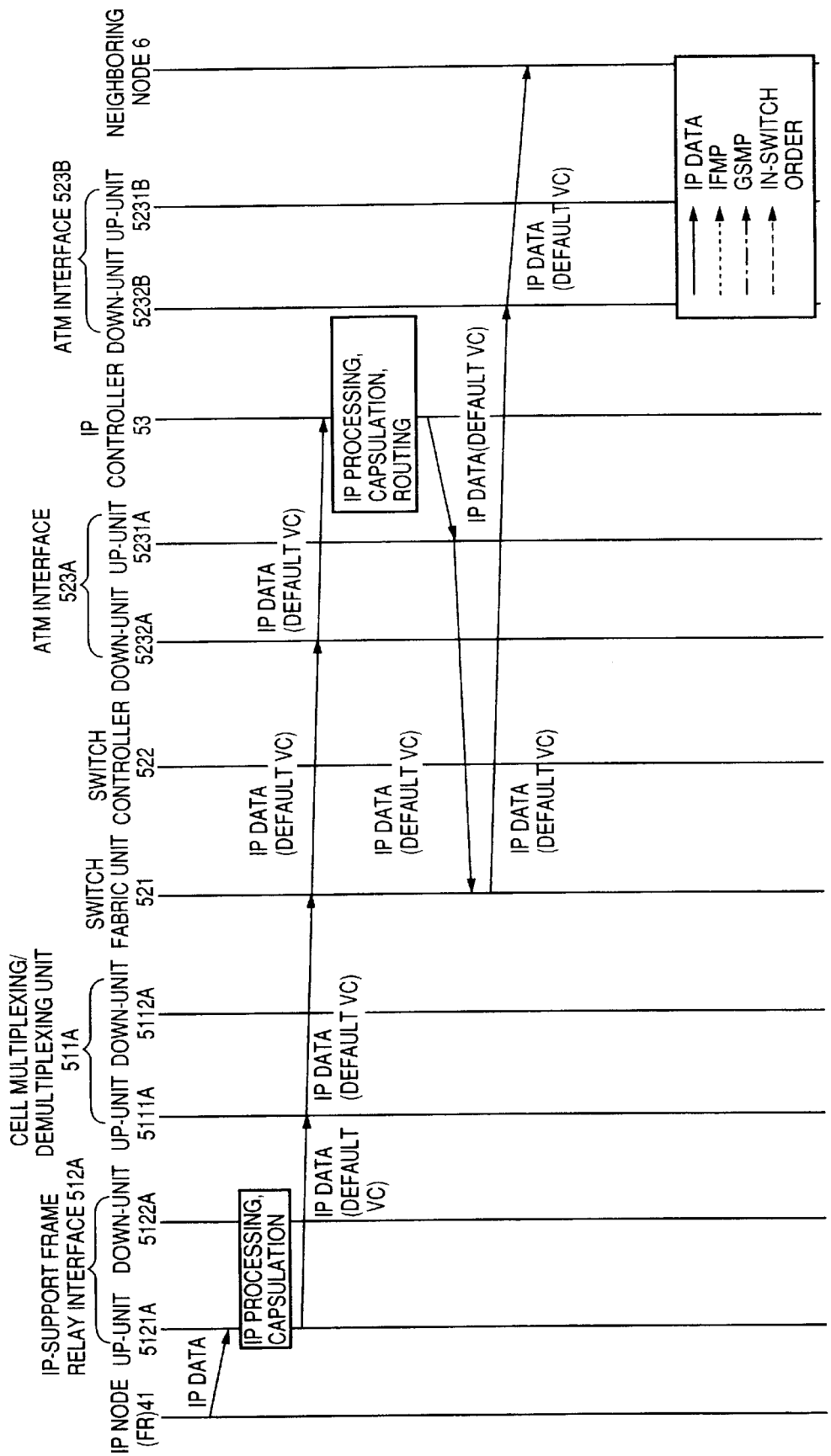

BETWEEN IP-SUPPORT FRAME RELAY INTERFACE 512A AND CELL MULTIPLEXING/DEMULTIPLEXING UNIT 511A

BETWEEN CELL MULTIPLEXING/DEMULTIPLEXING UNIT 511A AND ATM INTERFACE 523A

BETWEEN ATM INTERFACE 523A AND IP CONTROLLER 53 (STANDARD CELL FORMAT)

BETWEEN IP CONTROLLER 53 AND ATM
INTERFACE 523A (STANDARD CELL FORMAT)

BETWEEN ATM INTERFACE 523A AND
ATM INTERFACE 523B

BETWEEN ATM INTERFACE 523B AND
NEIGHBORING NODE 6 (STANDARD CELL FORMAT)

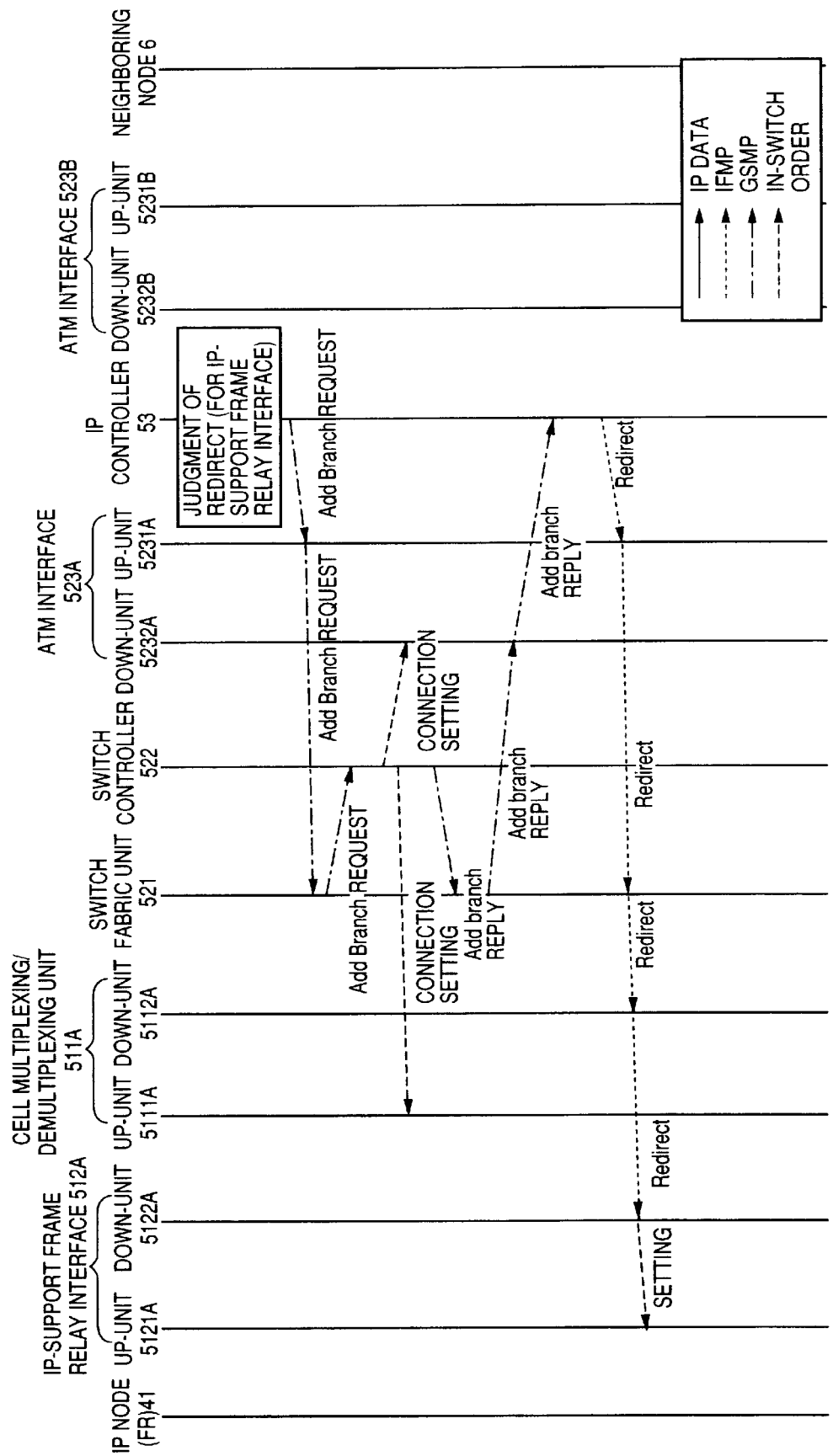

FIG.20A

GSMP Add Branch MESSAGE
(IP CONTROLLER 53→SWITCH CONTROLLER 522)

| INPUT SWITCH PORT NUMBER | INPUT VPI/VCI | OUTPUT SWITCH PORT NUMBER | OUTPUT VPI/VCI |
|---|---|---|---|
| 9 | (0,16) | 1 | (0,128) |

FIG.20B

IN-SWITCH ORDER CONNECTION SETTING (SWITCH CONTROLLER 522→ CELL MULTIPLEXING/DEMULTIPLEXING UP-UNIT 5111A)

| MULTIPLEX PORT NUMBER | LOCAL IDENTIFIER | OUTPUT PHYSICAL PORT NUMBER | INSIDE CONNECTION IDENTIFIER |
|---|---|---|---|
| 1 | 2 | 1 | 128 |

FIG.20C

IN-SWITCH ORDER CONNECTION SETTING
(SWITCH CONTROLLER 522→ ATM INTERFACE DOWN-UNIT 5232A)

| INSIDE CONNECTION IDENTIFIER | VPI/VCI |
|---|---|
| 128 | (0,128) |

FIG.20D

IFMP Redirect MESSAGE (IP CONTROLLER 53→IP-SUPPORT FRAME RELAY INTERFACE IP PROCESSOR 512A)

| VPI/VCI | IP FLOW IDENTIFIER |
|---|---|
| (0,16) | (x.x.x.x,y.y.y.y) |

FIG.20E

ORDER IN IP-SUPPORT FRAME RELAY INTERFACE 512A
(IP FLOW MANAGER 5123→TABLE 51215 OF THE UP-UNIT)

| IP FLOW IDENTIFIER | LOCAL IDENTIFIER |
|---|---|
| (x.x.x.x,y.y.y.y) | 2 |

BETWEEN IP-SUPPORT FRAME RELAY
INTERFACE 512A AND CELL MULTIPLEXING/
DEMULTIPLEXING UNIT 511A

BETWEEN CELL MULTIPLEXING/DEMULTIPLEXING UNIT
511A AND ATM INTERFACE 523A

BETWEEN ATM INTERFACE 523A AND IP CONTROLLER 53
(STANDARD CELL FORMAT)

FIG.24A

IFMP REDIRECT MESSAGE
(NEIGHBORING NODE 6→IP CONTROLLER 53)

| VPI/VCI | IP FLOW IDENTIFIER |
|---|---|
| (0,16) | (x.x.x.x,y.y.y.y) |

FIG.24B

GSMP MOVE BRANCH MESSAGE
(IP CONTROLLER 53→SWITCH CONTROLLER 522)

| INPUT SWITCH PORT NUMBER | INPUT VPI/VCI | OLD OUTPUT SWITCH PORT NUMBER | OLD OUTPUT VPI/VCI | NEW OUTPUT SWITCH PORT NUMBER | NEW OUTPUT VPI/VCI |
|---|---|---|---|---|---|
| 9 | (0,16) | 1 | (0,128) | 2 | (0,16) |

FIG.24C

IN-SWITCH ORDER CONNECTION SETTING
(SWITCH CONTROLLER 522→ATM INTERFACE DOWN-UNIT 5232B)

| INSIDE CONNECTION IDENTIFIER | VPI/VCI |
|---|---|
| 16 | (0,16) |

FIG.24D

IN-SWITCH ORDER CONNECTION CHANGE (SWITCH CONTROLLER 522→
CELL MULTIPLEXING/DEMULTIPLEXING UNIT UP-UNIT 5111A)

| MULTIPLEX PORT NUMBER | LOCAL IDENTIFIER | OUTPUT PHYSICAL PORT NUMBER | INSIDE CONNECTION IDENTIFIER |
|---|---|---|---|
| 1 | 2 | 2 | 16 |

FIG.24E

IN-SWITCH ORDER CONNECTION RELESE
(SWITCH CONTROLLER 522→ATM INTERFACE DOWN-UNIT 5232A)

| INSIDE CONNECTION IDENTIFIERR | VPI/VCI |
|---|---|
| 128 | (0,128) |

BETWEEN IP-SUPPORT FRAME RELAY INTERFACE 512A AND CELL MULTIPLEXING/DEMULTIPLEXING UNIT 511A

BETWEEN CELL MULTIPLEXING/DEMULTIPLEXING UNIT 511A AND ATM INTERFACE 523B

BETWEEN ATM INTERFACE 523B AND NEIGHBORING NODE 6 (STANDARD CELL FORMAT)

FIG.29

| LOCAL IDENTIFIER | IP FLOW IDENTIFIER | |
|---|---|---|
| 2 | (•,•) | FOR REDIRECT VC |
| 3 | (y.y.y.y,x.x.x.x) | |
| ... | ... | |

FIG.30

| INSIDE CONNECTION IDENTIFIER | MULTIPLEX PORT NUMBER | LOCAL IDENTIFIER | |
|---|---|---|---|
| 1 | 1 | 1 | |
| 129 | 2 | 1 | FOR DEFAULT VC |
| ... | ... | ... | |
| 1921 | 16 | 1 | |
| 2 | - | - | |
| 3 | 1 | 3 | FOR REDIRECT VC |
| ... | ... | ... | |

| VPI/VCI | OUTPUT PHYSICAL PORT NUMBER | INSIDE CONNECTION IDENTIFIER |
|---|---|---|
| ... | ... | ... |
| (0,15) | 1 | 16 |
| (0,16) | - | - |
| (0,17) | 1→9 | 129→3 |
| ... | ... | ... |
| ... | ... | ... |
| ... | ... | ... |
| ... | ... | ... |
| ... | ... | ... |
| ... | ... | ... |
| ... | ... | ... |
| (0,4095) | - | - |

FOR DEFAULT VC,
FOR REDIRECT VC

BETWEEN NEIGHBORING NODE 6 AND ATM INTERFACE 523B (STANDARD CELL FORMAT)

BETWEEN ATM INTERFACE 523B AND ATM INTERFACE 523A

BETWEEN ATM INTERFACE 523A AND IP CONTROLLER 53 (STANDARD CELL FORMAT)

BETWEEN IP CONTROLLER 53 AND ATM INTERFACE UNIT 523A
(STANDARD CELL FORMAT)

BETWEEN ATM INTERFACE 523A AND CELL
MULTIPLEXING/DEMULTIPLEXING UNIT 511A

BETWEEN IP-SUPPORT FRAME RELAY INTERFACES 512A

FIG.37A

GSMP Add Branch MESSAGE
(IP CONTROLLER 53→SWITCH CONTROLLER 522)

| INPUT SWITCH PORT NUMBER | INPUT VPI/VCI | OUTPUT SWITCH PORT NUMBER | OUTPUT VPI/VCI |
|---|---|---|---|
| 2 | (0,17) | 1 | (0,129) |

FIG.37B

IN-SWITCH ORDER CONNECTION SETTING
(SWITCH CONTROLLER 522→ATM INTERFACE DOWN-UNIT 5232A)

| INSIDE CONNECTION IDENTIFIER | VPI/VCI |
|---|---|
| 129 | (0,129) |

FIG.37C

IN-SWITCH ORDER CONNECTION SETTING
(SWITCH CONTROLLER 522→ATM INTERFACE UP-UNIT 5231B)

| VPI/VCI | OUTPUT PHYSICAL PORT NUMBER | INSIDE CONNECTION IDENTIFIER |
|---|---|---|
| (0,17) | 1 | 129 |

FIG.37D

IFMP REDIRECT MESSAGE
(IP CONTROLLER 53→NEIGHBORING NODE 6)

| VPI/VCI | IP FLOW IDENTIFIER |
|---|---|
| (0,17) | (y.y.y.y,x.x.x.x) |

BETWEEN NEIGHBORING NODE 6 AND ATM INTERFACE 523B
(STANDARD CELL FORMAT)

BETWEEN ATM INTERFACE 523B AND ATM INTERFACE 523A

BETWEEN ATM INTERFACE 523A AND IP CONTROLLER 53
(STANDARD CELL FORMAT)

FIG.41A

ORDER IN IP-SUPPORT FRAME RELAY INTERFACE 512A
(IP FLOW MANAGER 5123→DOWN-UNIT TABLE 51225)

| IP FLOW IDENTIFIER | LOCAL IDENTIFIER |
|---|---|
| (y.y.y.y,x.x.x.x) | 3 |

FIG.41B

IFMP REDIRECT MESSAGE
(IP-SUPPORT FRAME RELAY INTERFACE 512A→IP CONTROLLER 53)

| VPI/VCI | IP FLOW IDENTIFIER |
|---|---|
| (0,17) | (y.y.y.y,x.x.x.x) |

FIG.41C

GSMP MOVE BRANCH MESSAGE
(IP CONTROLLER 53→SWITCH CONTROLLER 522)

| INPUT SWITCH PORT NUMBER | INPUT VPI/VCI | OLD OUTPUT SWITCH PORT NUMBER | OLD OUTPUT VPI/VCI | NEW OUTPUT SWITCH PORT NUMBER | NEW OUTPUT VPI/VCI |
|---|---|---|---|---|---|
| 2 | (0,17) | 1 | (0,129) | 9 | (0,17) |

FIG.41D

IN-SWITCH ORDER CONNECTION SETTING (SWITCH CONTROLLER 522→ CELL MULTIPLEXING/DEMULTIPLEXING DOWN-UNIT 5112A)

| INSIDE CONNECTION IDENTIFIER | MULTIPLEX PORT NUMBER | LOCAL IDENTIFIER |
|---|---|---|
| 3 | 1 | 3 |

FIG.41E

IN-SWITCH ORDER CONNECTION CHANGE
(SWITCH CONTROLLER 522→ATM INTERFACE UP-UNIT 5231B)

| VPI/VCI | OUTPUT PHYSICAL PORT NUMBER | INSIDE CONNECTION IDENTIFIER |
|---|---|---|
| (0,17) | 9 | 3 |

FIG.41F

IN-SWITCH ORDER CONNECTION RELEASE
(SWITCH CONTROLLER 522→ATM INTERFACE DOWN-UNIT 5232A)

| INSIDE CONNECTION IDENTIFIER | VPI/VCI |
|---|---|
| 129 | (0,129) |

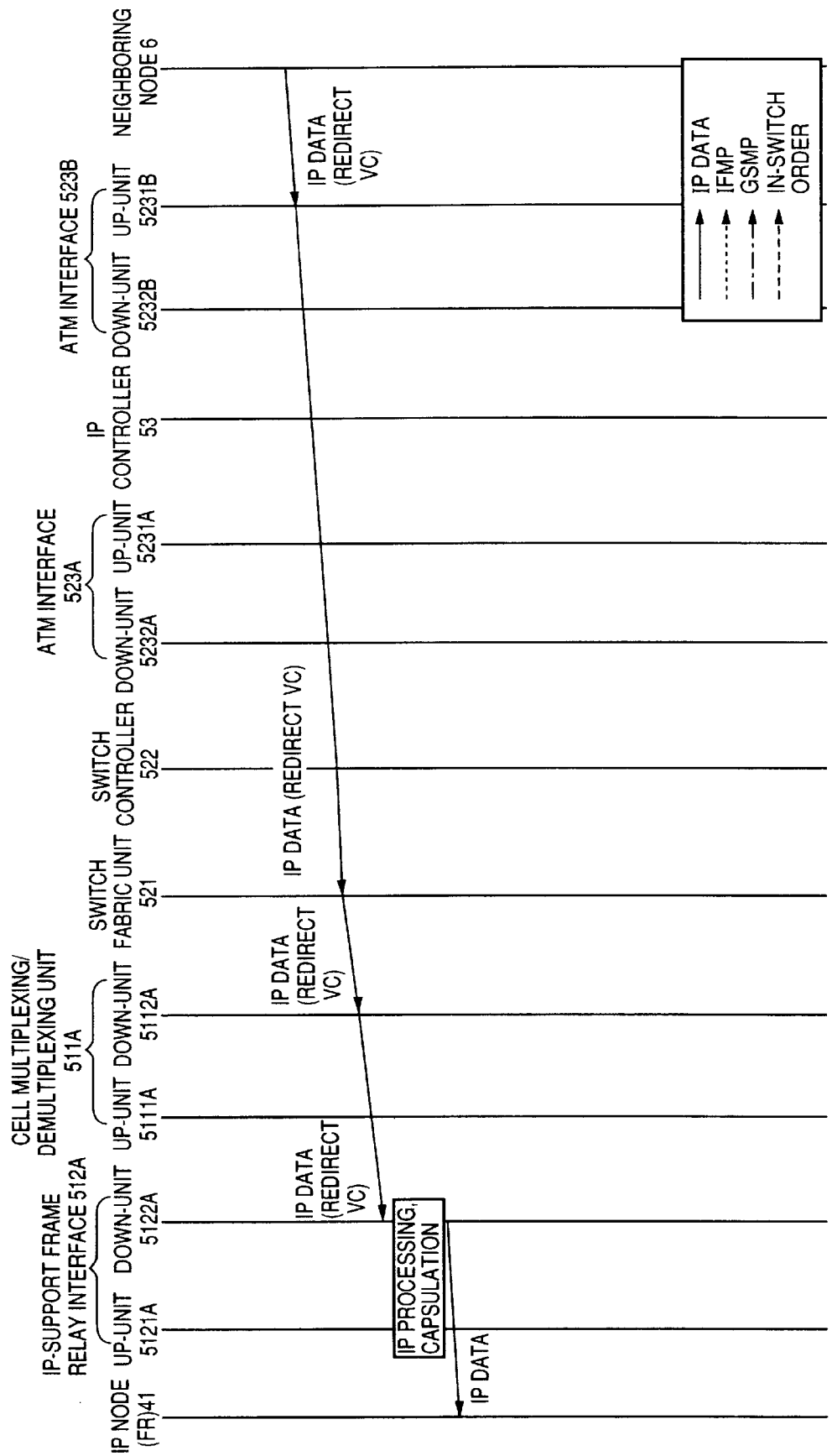

BETWEEN NEIGHBORING NODE 6 AND ATM INTERFACE 523B
(STANDARD CELL FORMAT)

BETWEEN ATM INTERFACE 523B AND CELL
MULTIPLEXING/DEMULTIPLEXING UNIT 511A

BETWEEN CELL MULTIPLEXING/DEMULTIPLEXING UNIT 511A
AND IP-SUPPORT FRAME RELAY INTERFACE 512A

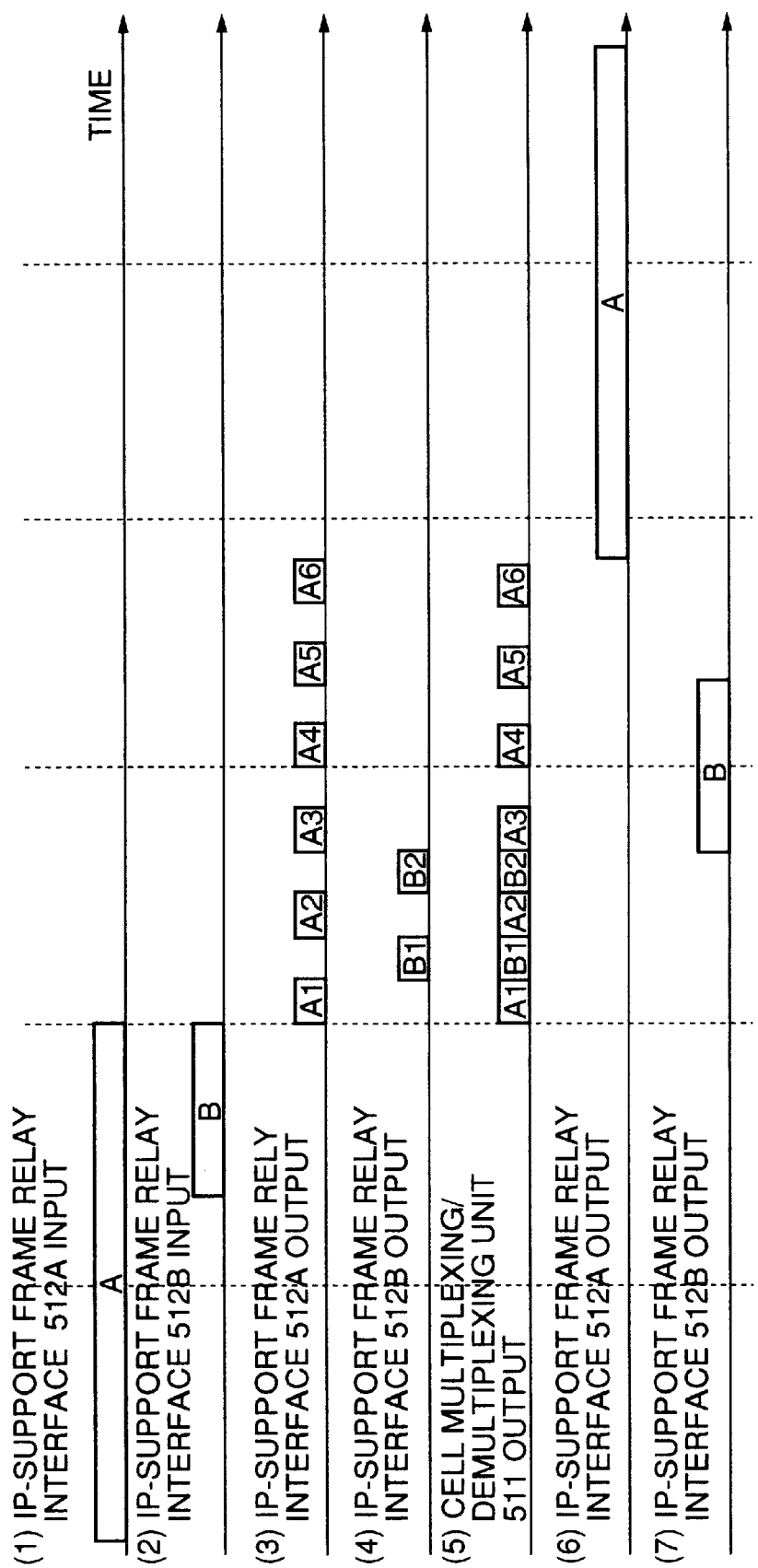

ROUTER APPARATUS USING ATM SWITCH

This is a continuation of application Ser. No. 09/028,830, filed Feb. 13, 1998, now U.S. Pat. No. 6,046,999 which is a continuation-in-part of Ser. No. 08/923,873, filed Sep. 2, 1997 now U.S. Pat. No. 5,963,555.

BACKGROUND OF THE INVENTION

The present application is a continuation-in-part application of US patent application filed on Sep. 2, 1997, based on Japanese Patent Application No. 8-233045, which is currently pending.

1. Field of the Invention

The present invention relates to a router apparatus which switches packets entailing the processing of a packet switching type layer 3 like IP (Internet Protocol), etc. by using an ATM (Asynchronous Transfer Mode, and particularly to a router apparatus for multiplexing plural transmission paths for one physical port of the ATM switch.

2. Description of the Related Art

An IP (Internet Protocol) switching network which has been proposed by Epsilon Company has been known as a network which enables high-speed IP-packet transmission by using an ATM technique. As shown in FIG. 48, this network includes an IP switch 1 and an IP switch gateway 2, and enables high-speed transmission and switching of IP packets which have been communicated between conventional LAN/IP networks such as Ethernet, FDDI or the like which is connected to the IP switch gateway 2.

In FIG. 48, a network is illustrated as being divided into a layer 2 (base or subordinate) and a layer 3 (enhancement or superordinate), and a heavy line connecting both the layers 2 and 3 represents the shift of processing between the layers. An IP node 4 serving as a router of a LAN?IP network or the like first performs LAN protocol processing of the layer 2 of Ethernet or the like on an arriving packet (datagram), and then performs IP protocol processing of the layer 3 of the superordinate (i.e., enhancement layer 3) on the packet. Subsequently, after a route through which the packet will be transmitted is determined, the processing of the layer 2 is performed again and the packet is transmitted to an adjacent node. In the IP switch gateway 2 of the IP switching network, the processing of the layer 2 and the processing of the layer 3 are also performed on all the packets to be transmitted. The IP switch 1 also performs the processing of the layers 2 and 3, however, packets which are cut through in communications between an IP switch gateway 2 and an IP switch 1 or between IP switches 1 are subjected to only the processing of the layer 2, and then transmitted. In FIG. 48, heavy lines which should be originally illustrated between the layers 2 and 3 are replaced by heavy dotted lines in order to show that the processing of the layer 3 is cut through.

FIG. 49 shows a constitution example of the IP switch 1 and the IP switch gateway 2. The IP switch 1 comprises an ATM switch 11 and an IP controller 12, and it switches ATM cells with the IP switch gateway 2 connected to the physical port of the ATM switch 11 and with an IP node 3 for performing ATM communications. The IP switch gateway 2 comprises plural LAN interfaces 21A, 21B each of which is individually connected to each transmission path of the LAN?IP network connected to the IP node 4, an IP datagram multiplexing/ demultiplexing unit 22 for multiplexing/ demultiplexing IP packets which are communicated in the LAN interface, an IP processor 23, and an ATM interface 24 which is connected to the physical port of the ATM switch 11. In this constitution, the IP controller 12 of the IP switch 1 and the IP processor 23 of the IP switch gateway 2 perform communication control on IP in cooperation with each other on the basis of a protocol which is called IFMP (Ipsilon Flow Management Protocol). Here, "flow" represents a train of packets which are transmitted from a transmitting side (transmission source) terminal to a transmitted side (transmission destination) terminal, for example. The IP controller 12 controls VC (Virtual Channel) connection in cooperation with the ATM switch 11 on the basis of a protocol which is called GSMP (General Switch Management Protocol).

The communication between the IP switch gateways 2 which are connected to each other through the IP switch 1 will be described with reference to FIG. 50. IP packets A and B which are transmitted from plural IP nodes 4 of the LAN?IP network to the IP switch gateway 2 are serially multiplexed in this order in the IP datagram multiplexing/ demultiplexing unit 22. After the multiplexed IP packets are successively subjected to IP processing in the IP processor 23, they are converted to ATM cells in the ATM interface 24 and then transmitted to the IP switch 1. The ATM cells which are transmitted to the IP switch 1 are transmitted to the IP switch gateway 2 serving as a transmitting side, and processed in the ATM interface 24 and the IP processor 23. Thereafter, the ATM cells thus processed are successively synthesized into IP packets in the IP datagram multiplexing/ demultiplexing unit 22 and then transmitted to the LAN interface 21 serving as a transmitted side. After receiving all data of the IP packet, each LAN interface 21 individually transmits the IP packet to the transmission path of the LAN?IP network.

SUMMARY OF THE INVENTION

In the conventional system, all the IP packets which are transmitted by the IP switch gateway 2 must be processed in the IP processor 23, and thus the amount of communication to be performed in the IP switch gateway 2 is restricted, so that the multiplicity of the communication in the overall system cannot be enhanced.

Further, in the IP switch gateway 2, the IP packet is serially multiplexed and then subjected to the IP processing. Therefore, as shown in FIG. 50, when an IP packet A having a large data amount is transmitted from a transmission path, the processing and the transmission of an IP packet B which is transmitted from another transmission path are greatly delayed. This is a critical drawback in a public network which needs fairness with respect to access.

Still further, when applied to a public network, not only a service of IP packets, but also various services of frame relays, low-speed ATMs, channel emulation, etc are required, however, the IP switch gateway 2 is structurally restricted so that it can support only the service of IP packets and thus the practical use of the network is restricted.

Therefore, the present invention has an object to provide a router apparatus which enhances the multiplicity of communications performed through an ATM switch.

Further, the present invention has another object to provide a router apparatus which reduces the delay variation between communications of different multiplexing transmission paths.

Still further, the present invention has a further object to provide a router apparatus which can support various types of communications.

In order to attain the above objects, a router apparatus according to the present invention in which packets entailing the processing of a packet switching type layer 3 in a communication are switched by using an ATM switch, is characterized by comprising an ATM switch for switching cells, plural interfaces which are connected to plural transmission paths for transmitting the packets, a cell multiplexing/demultiplexing unit which is connected to one physical port of the ATM switch and the plural interfaces, and a layer 3 controller for executing and managing the processing of the layer 3 in the apparatus itself, wherein each interface comprises means for converting packets transmitted from the connected transmission path to cells and then transmitting the cells to the cell multiplexing/ demultiplexing unit, means for converting the cells transmitted from the cell multiplexing/demultiplexing unit to packets and then transmitting the packets thus obtained to the transmission path being connected, and means for converting information on the header portions of the cells and the packets which are transmitted and received for processing of the layers, and the cell multiplexing/ demultiplexing unit includes means for serially multiplexing cells transmitted from the plural interfaces being connected and then transmitting the serially-multiplexed cells to the ATM switch, and means for demultiplexing the cells transmitted from the ATM switch and distributing the separated cells to the interface connected to the transmission path serving as the transmission destination, wherein on the basis of a communication indicating plural kinds of identification information for identifying flow of a cell or packet, which contain logical port numbers set for each interface and a non-connected physical port of the ATM switch of the cell multiplexing/ demultiplexing unit, logical channel information set for the flow of the cell at the interface and the physical port, and address information of the layer 3 set for the flow of the packet at the interface, the layer 3 controller executes the processing of the layer 3 in cooperation with the interface and the ATM switch to alter the content of the switching of the packet.

According to the router apparatus as described above, the processing of the packet switching type layer 3 and the cellularizing processing are performed in each interface, and the cell multiplexing processing is performed in the cell multiplexing/demultiplexing unit, so that the packet communication delay which needs the processing of the layer 3 can be reduced and thus the multiplicity of the flow of the packets in the apparatus itself can be enhanced.

Further, in the router apparatus as described above, the serially multiplexing means of the cell multiplexing/ demultiplexing unit multiplexes the cells transmitted from the plural interfaces being connected on a cell basis so that the communication delay variation between the interfaces is reduced.

Still further, according to the present invention, a router apparatus for switching data blocks of communications other than a normal ATM communication by using an ATM switch, is characterized by including an ATM switch for performing cell switching, plural interfaces which are connected to one or plural transmission paths for plural separate kinds of data blocks containing packets which entail the processing of the packet switching type layer 3 in the communication, a cell multiplexing/demultiplexing unit which is connected to one physical port of the ATM switch and the plural interfaces, and a layer 3 controller for executing and managing the processing of the layer 3 in the apparatus thereof, wherein each of the interfaces includes: means for converting the data blocks transmitted from the transmission path to cells of a common format and transmitting the cells to the cell multiplexing/demultiplexing unit; means for converting the cells transmitted from the cell multiplexing/demultiplexing unit to the data blocks corresponding to the communication through the connected transmission path; and means which is provided when the processing of the layer 3 is needed and adapted to convert the information of the header portions of the cells and the data blocks to be received and transmitted for the processing of the layer 3, the cell multiplexing/demultiplexing unit includes: means for serially multiplexing the cells transmitted from the plural interfaces and transmitting the serially-multiplexed cells to the ATM switch; and means for demultiplexing the cells transmitted from the ATM switch and distributing the cells to the interface connected to the transmission path serving as a transmission destination, and the layer 3 controller executes the processing of the layer 3 in cooperation with an interface and an ATM switch to alter the content of the switching of the packet on the basis of a communication indicating plural kinds of identification information for identifying flow of the cell or the packet, which contain logical port numbers set for each interface and a non-connected physical port of the ATM switch of the cell multiplexing/demultiplexing unit, logical channel information set for the flow of the cell at the interface and the physical port, and address information of the layer 3 set for the flow of the packet at the interface.

According to the router apparatus, the multiplexing and switching processing can be performed not only on the communication of packets which need the processing of the packet switching type layer 3, but also on various kinds of communication such as the communication of cells which need the processing of the layer 3, the communication which does not need the processing of the layer 3, the communication of channel switching, etc.

BRIEF DESCRIPTION OF THE DRAWINGS

FIG. 5 is a diagram showing an example of the corresponding relationship of each kind of identification information which is used in the IP switch with multiplexer;

FIG. 11 is a diagram showing an example of a table of an IP-support frame relay interface up-unit A;

FIG. 12 is a diagram showing an example of a table of an up-unit of a cell multiplexing/demultiplexing unit;

FIG. 15 is a diagram showing an example of a table of the up-unit A of the ATM interface;

FIG. 16 is a diagram showing an example (part 1) of a processing sequence in up-flow;

FIG. 19 is a diagram showing an example (part 2) of the processing sequence in the up-flow;

FIGS. 20A to 20E are diagrams showing an example (part 1) of a control message for the up-flow;

FIGS. 24A to 24E are diagrams showing an example (part 2) of the control message for the up-flow;

FIG. 29 is a diagram showing a table of an IP-support frame relay interface down-unit A;

FIG. 30 is a diagram showing an example of a table of a down-unit of a cell multiplexing/demultiplexing unit;

FIGS. 37A to 37D are diagrams showing an example (part 1) of a control message for the down-flow;

FIGS. 41A to 41F are diagrams showing an example (part 2) of the control message for the down-flow;

FIG. 42 is a diagram showing an example of the processing sequence in the down-flow;

FIG. 44 is a diagram showing an example of packet delay in an IP switch with a multiplexer;

DETAILED DESCRIPTION OF THE PREFERRED EMBODIMENTS

Preferred embodiments according to the present invention will be described hereunder with reference to the accompanying drawings.

Figure 1:
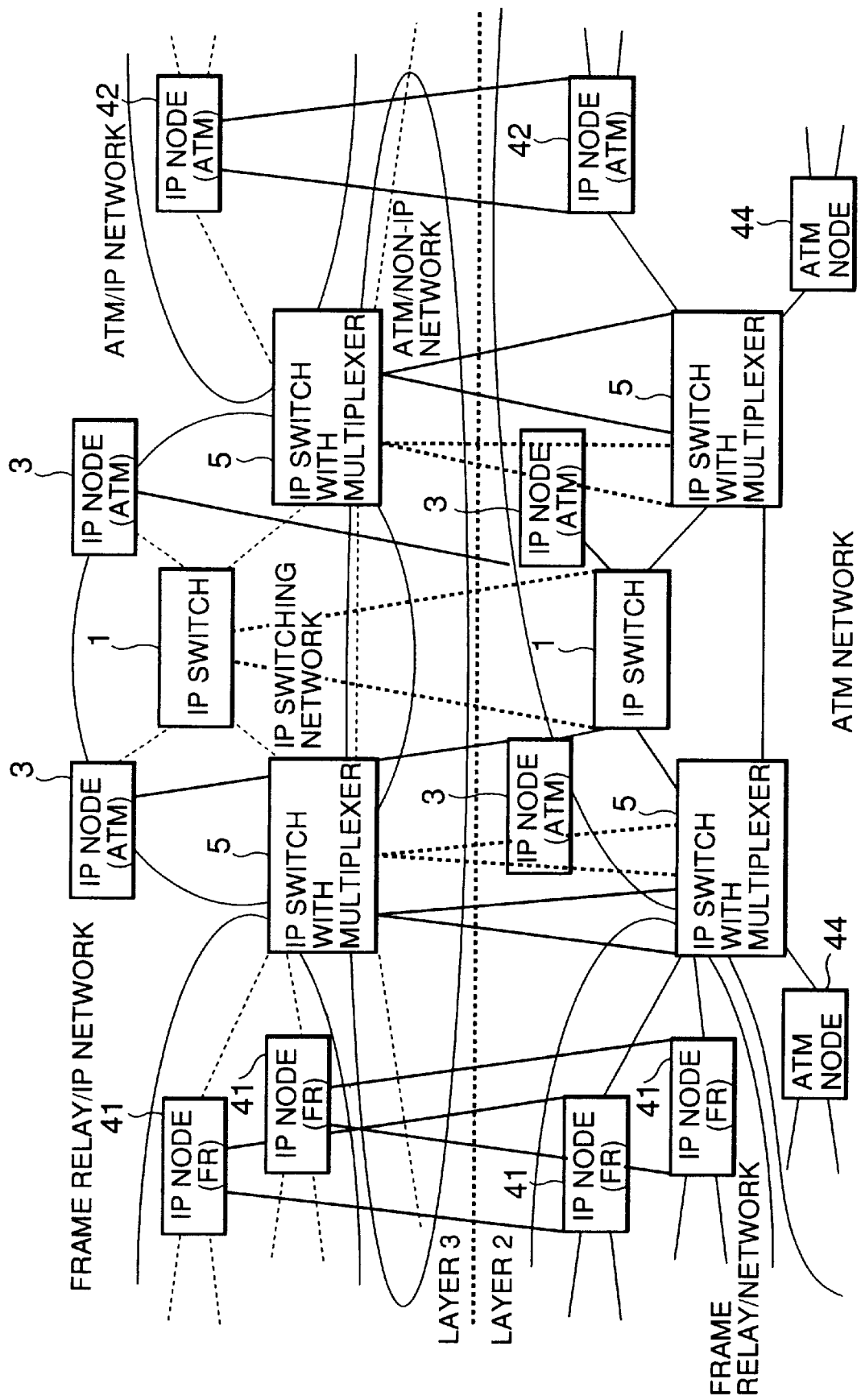
FIG. 1 is a diagram showing an example of a network to which an IP switch with multiplexer according to the present invention is applied.
Figure 48:
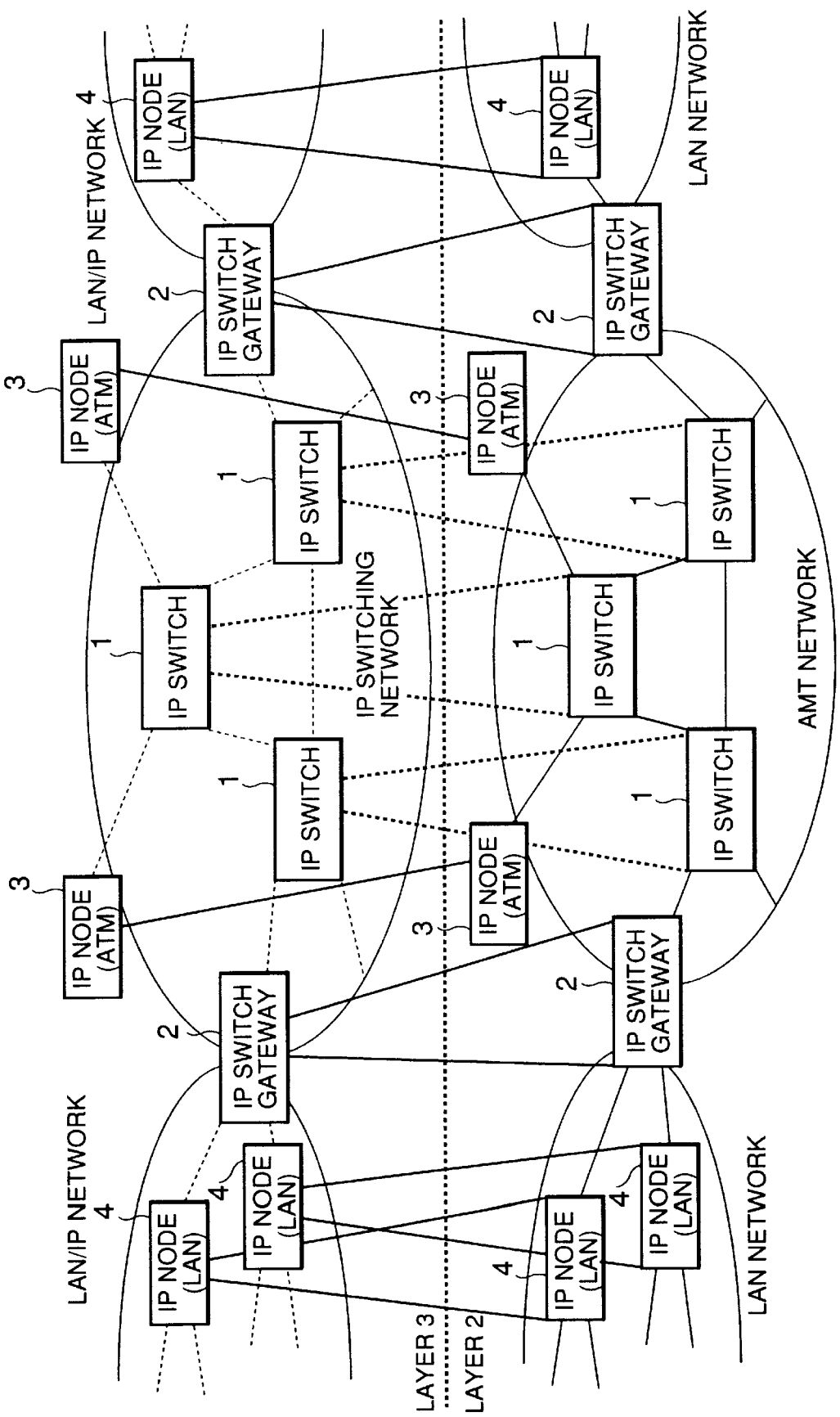
FIG. 48 is a diagram showing an example of a conventional IP switching network.
Figure 49:
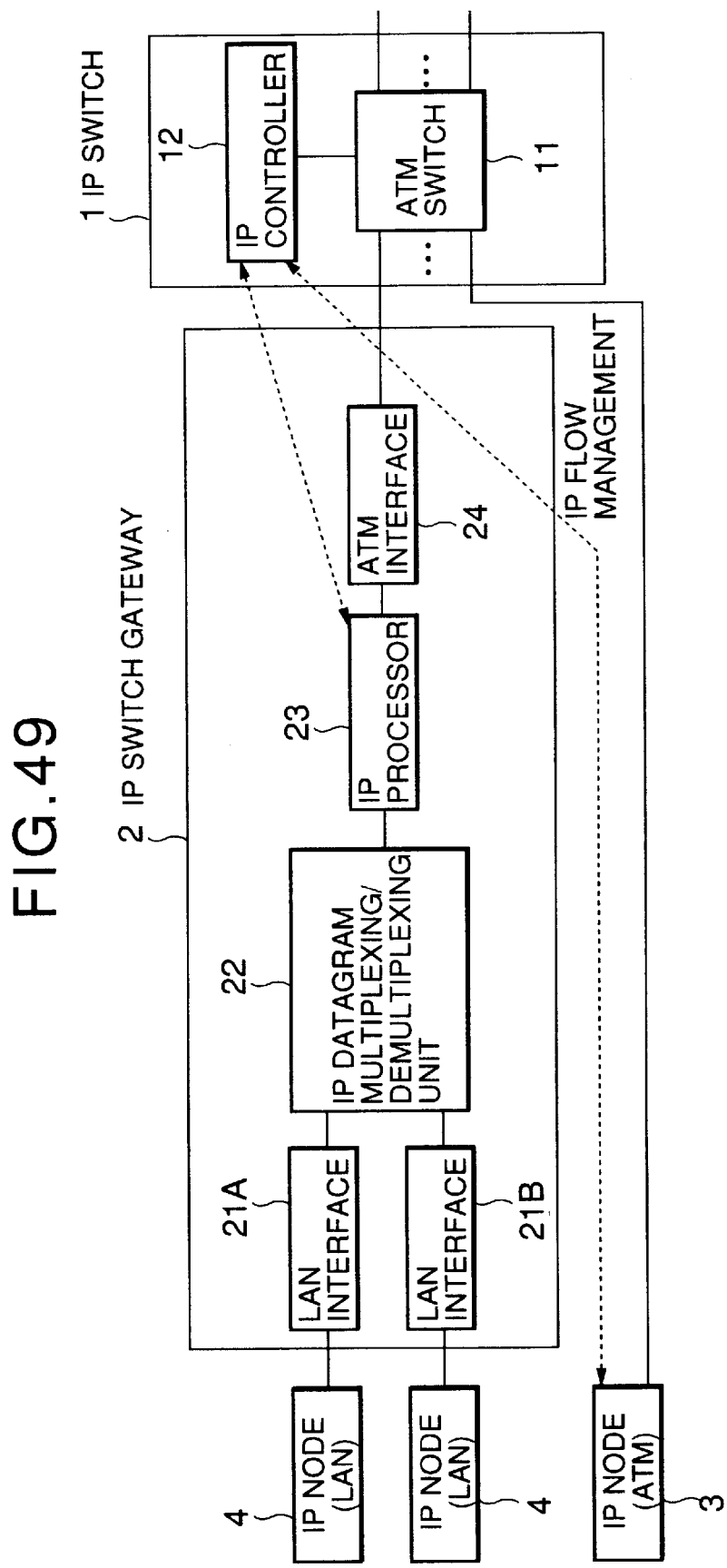
FIG. 49 is a diagram showing a conventional example of an IP switch and an IP switch gateway.

FIG. 1 shows an example of a network to which an IP switch with a multiplexer (a router apparatus using an ATM switch) according to an embodiment of the present invention is applied. In FIG. 1, the network is illustrated as being divided into logical layers, a layer 2 (subordinate layer) and a layer 3 (superordinate layer) as in the case of FIG. 48. The following description is directed to a case where IP (Internet Protocol) is used as a protocol of the layer 3. However, protocols of the layer 3 other than IP may be used.

In the network shown in FIG. 1 an IP switching network is constructed which connects a frame relay/IP network for transmitting IP packets on a frame relay and an ATM/IP network for transmitting IP packets on ATM. Since even an ATM/non-IP network for transmitting traffic other than IP by ATM can be connected to the IP switching network, the ATM network of the layer 2 can supply various services which are not limited to the service of the IP packets. The IP switch 5 with a multiplexer accommodates the transmission paths of the various kinds of networks as described above, and executes the switching processing of ATM cells and IP packet and various protocol processing such as IP, IFMP, GSMP, etc.

Figure 2:
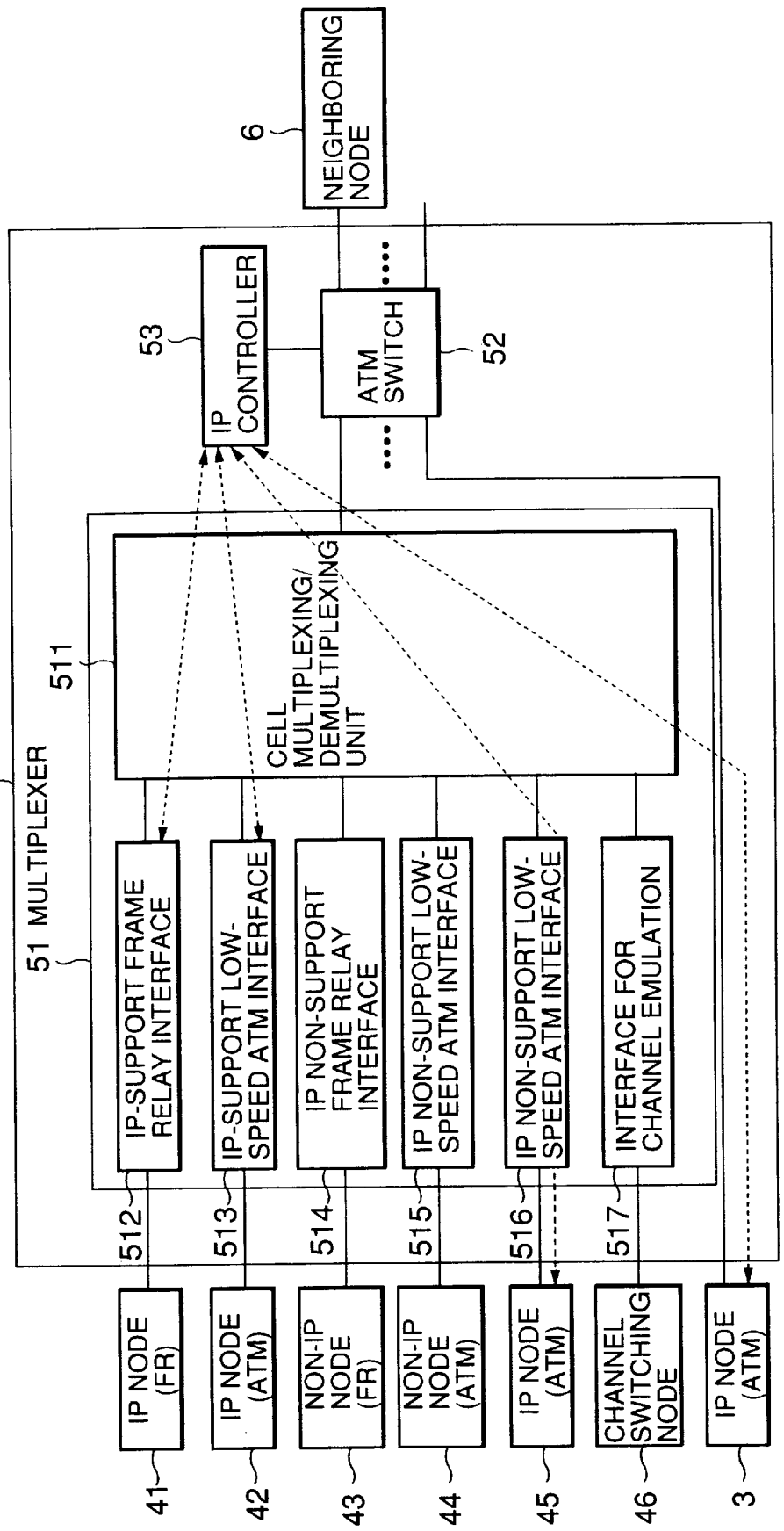
FIG. 2 is a diagram showing an example of the constitution of the IP switch with multiplexer.

FIG. 2 shows the constitution of the IP switch 5 with a multiplexer according to the embodiment.

In FIG. 2, the IP switch 5 with a multiplexer includes a multiplexer 51 which accommodates the transmission paths of plural networks therein, an ATM switch 52 for switching ATM cells, and an IP controller 53 for performing IP processing for routing control on the basis of IFMP and GSMP. The multiplexer 51 is connected to one physical port of the ATM switch 52 as well as the transmission paths accommodated therein, and communicates ATM cells with the physical port. Other physical ports of the ATM switch 52 to which the multiplexer 51 is not connected are connected to the transmission paths of an IP controller 53, an IP node (ATM) 3 for communicating ATM cells, neighboring nodes 6, etc.

The multiplexer 51 comprises plural interfaces 512 to 517 which are provided in conformity with the transmission paths or transmission path groups accommodated therein, and a cell multiplexing/demultiplexing unit 511. The interfaces 512 to 517 and the transmission paths accommodated therein communicate respective IP packets and cells having the same format as nodes which are connected to the respective transmission paths, and also communicates cells having the common format with the cell multiplexing/demultiplexing unit 511. The cell multiplexing/demultiplexing unit 511 serially multiplexes the cells from the interfaces 512 to 517 and transmits the cells thus serially-multiplexed to the ATM switch 52, and the cells transmitted from the ATM switch 52 are separated from each other and then distributed to the respective corresponding interface interfaces 512 to 517.

Here, a plurality of multiplexers 51 may be disposed in the IP switch 5 with a multiplexer. Further, any kind and any number may be selected for the interfaces being disposed. For example, when many multiplexers 51 and many IP-support frame relay interfaces are disposed, a large-capacity IP switch gateway function can be achieved. In the following description, the constitution and the operation when the multiplexer 51 includes plural IP-support frame relay interfaces 512 will be described, and then the other interfaces 513 to 517 will be described.

The IP-support frame relay interface 512 is connected to the transmission paths of one or plural IP nodes 41, and performs a frame relay communication based on HDLC (High Level Data Link Control). Here, the IP node 41 has IP (Internet Protocol) as a protocol for network layer and communicates IP packets by frame relay.

Figure 3:
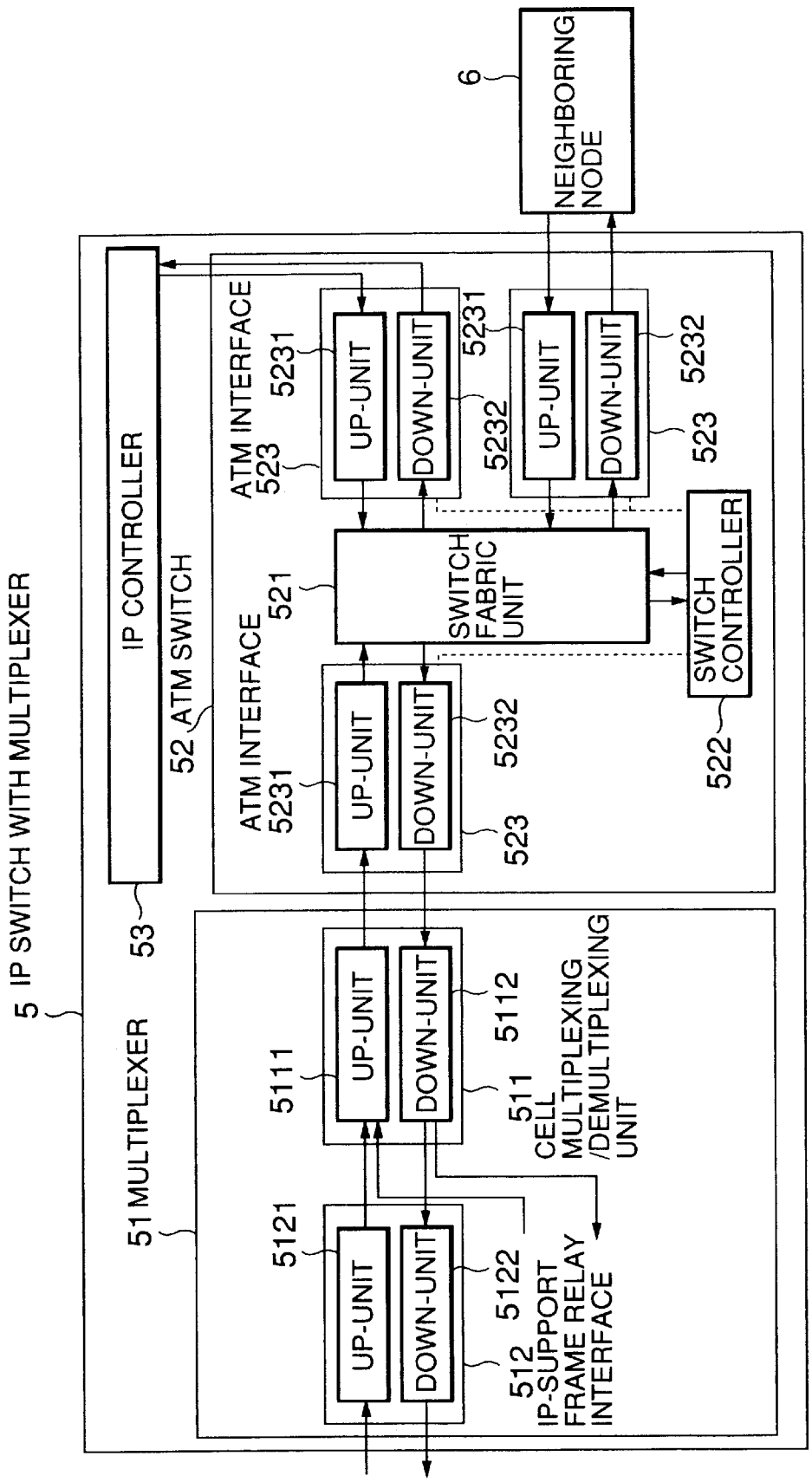
FIG. 3 is a diagram showing an example of the detailed constitution of the IP switch with multiplexer.

FIG. 3 shows the functionally-fragmented constitution of the IP switch 5 with multiplexer. In FIG. 3, the ATM switch 52 includes plural ATM interfaces 523 which are provided every physical port, a switch fabric unit 521 for switching a communication route on a cell basis, and a switch controller 522 for controlling the switching operation of the switch fabric unit 521. Here, for the sake of convenience, each part of the IP switch 5 with a multiplexer is divided into an up-unit for processing signals transmitted to the switch fabric unit 521 side and a down-unit for processing signals transmitted from the switch fabric unit 521 unit. The switch controller 522 controls each ATM interface 523 by control lines indicated by dotted lines in FIG. 3.

Figure 4:
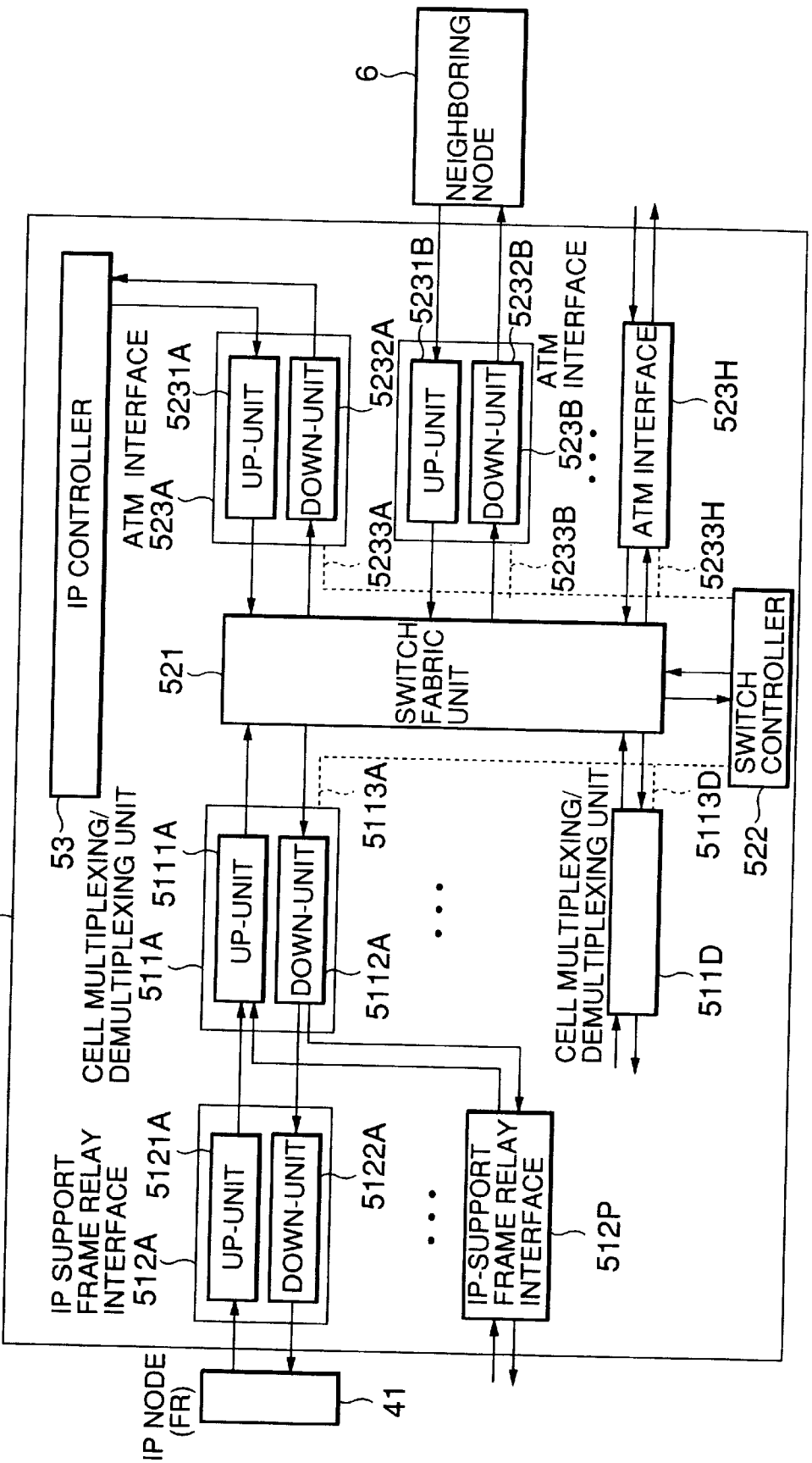
FIG. 4 is a diagram showing another example of constitution of the IP switch with multiplexer.

FIG. 4 is a diagram showing another embodiment of the IP switch 5 with a multiplexer.

The IP switch 5 with a multiplexer shown in FIG. 4 is obtained by integrating an ATM switch and a multiplexer, and achieves the same function as the apparatus shown in FIG. 3 by providing the cell multiplexing/demultiplexing unit with the function of the ATM interface processor. In the following description, the IP switch 5 with a multiplexer will be described on the basis of the constitution shown in FIG. 4.

In FIG. 4, the switch fabric unit 521 has a total of twelve physical ports which are successively numbered from first to twelfth. ATM interfaces 523A to 523H are connected to the first to eighth physical ports, and cell multiplexing/demultiplexing units 511A to 511D are connected to the ninth to twelfth physical ports. Each cell multiplexing/demultiplexing unit 511 is connected to each of 16 interfaces. For example, the cell multiplexing/demultiplexing unit 511A connected to the ninth physical port is connected to the IP-support frame relay interfaces 512A to 512P.

FIG. 5 shows an example of the corresponding relationship of identification information (address information) of each kind of port used in the IP switch 5 with a multiplexer.

A switch port number is a serial number which is set for each of various interfaces such as the ATM interface, the IP-support frame relay interface, etc. The IP controller 53 recognizes the port with the switch port number.

A multiplex port number is a serial number which is set for the interface connected to the cell multiplexing/demultiplexing unit 511. In this embodiment, a value of 1 to 16 is taken for every cell multiplexing/demultiplexing unit 511. Each cell multiplexing/demultiplexing unit 511 recognizes the port of the interface with the multiplex port number.

Next, various kinds of identifiers for connection on each of default VC which is fixedly covered in advance by PVC (Permanent VC) and redirect VC which is dynamically covered by the processing of IFMP and GSMP will be described.

A local identifier is an identifier for uniquely identifying a connection which is used in a communication between the cell multiplexing/demultiplexing unit 511 and each interface. The connection in the cell multiplexing/demultiplexing unit 511 is allowed to be uniquely identified on the basis of the local identifier and the multiplex port number.

In this embodiment, 128 connections are assumed for every IP-support frame relay interface, and the first local identifier is allocated to the default VC and the second to 128-th local identifiers are allocated to the redirect VC.

An inside connection identifier is used to uniquely identify the connection used in a communication between cell multiplexing/demultiplexing units 511, between ATM interfaces or between the cell multiplexing/demultiplexing unit 511 and the ATM interface in the cell multiplexing unit 511 or the ATM interface 523. The connection in the switch fabric unit 521, that is, the IP switch 5 with a multiplexer, can be uniquely identified on the basis of the inside connection identifier and the physical port number. In this embodiment, 4095 connections are assumed for every ATM interface, and the inside connection identifiers are allocated so that the first inside connection identifier is allocated to the default VC and the second to 4095-th inside connection identifiers are allocated to the redirect VC in each of the ATM interfaces 523B to 523H.

Since the defaults VC of all the other interfaces are concentrated on the ATM interface 523A connected to the IP controller, the inside connection identifiers are allocated so that the 16-th to 86-th inside connection identifiers are allocated to the defaults VC and the 128-th to 4095-th inside connection identifiers are allocated to the redirects VC. Here, the remaining 15-th inside connection identifier is used for the connection for GSMP connected to the switch controller, and the other remaining numbers are kept as skipped numbers or used for another purpose. Further, with respect to the connection of each cell multiplexing/demultiplexing unit 511, the first to 2048-th inside connection identifiers are successively allocated in the order from the smaller number to the larger number in the multiplex port numbers as shown in FIG. 5.

VPI/VCI represents an identifier for a connection which is standardly used without being restricted to use in the apparatus. For example, VPI/VCI is used for communications with the outside of the ATM interface. In this embodiment, all of VPI are set to zero, and VCI is set to the same value as the inside connection identifier. However, VPI=0 and VCI=15 (hereinafter represented by(0,15)) are allocated to the default VC. Further, a VCI value corresponding to addition of the value of the local identifier and 14 for example is allocated to the redirect VC of the cell multiplexing/demultiplexing unit 511.

The information representing the corresponding relationship between each type port number and each type identification information as described above is partially registered in tables which are provided in each type interface and each cell multiplexing/demultiplexing unit. According to the registration contents of the tables thereof, each type interface and each type cell multiplexing/demultiplexing unit convert the identification information (address information) of header portions to IP packets and cells to be communicated. A method as disclosed in Japanese Laid-open Patent Application No. Hei-8-233045 may be adopted for the traffic control which is performed in cooperation of the interface and the ATM switch.

Each part of the IP switch with multiplexer 5 will now be described in detail.

Figure 6:
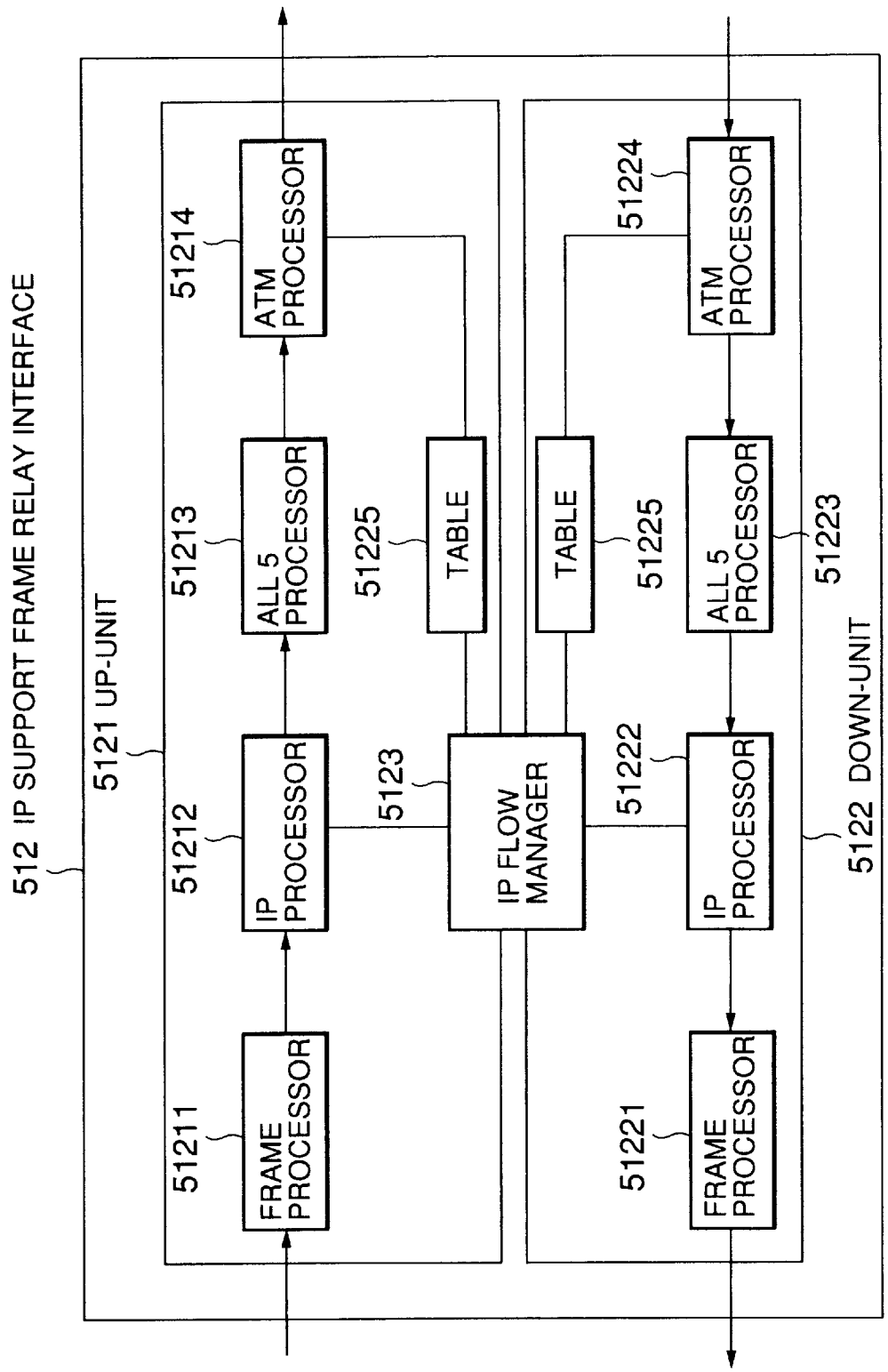
FIG. 6 is a diagram showing an example of the constitution of an IP-support frame relay interface.

FIG. 6 shows the constitution of the IP-support frame relay interface 512.

As shown in FIG. 6, the IP-support frame relay interface 512 comprises an up-unit 5121, a down-unit 5122 and an IP flow management unit 5123 for performing the processing of IFMP. Each of th up-unit 5121 and the down-unit 5122 comprises a frame processor for communicating IP packets on the basis of frame relay,-an IP processor, an ALL5 processor for performing the processing based on the protocol of ALL type 5, an ATM processor for communicating cells, and a table which is used to convert the identification information of the header portions of the cells and the IP packets. In FIG. 6, only one transmission path is connected to the frame processor, but, plural transmission paths may be connected to the frame processor.

In the constitution as described above, the IP packets which are transmitted from a network to the up-unit 5121 are subjected to reception processing in a frame processor 51211, and then subjected to IP processing such as detection of address information, etc. in an IP processor 51212. The IP packets thus processed are divided into SAR-PDU frames in an ALL5 processor 51213, then converted to a cell which sets the identification information (local identifier) determined on the basis of the registration content of a table 51215 in the ATM processor 51214, and then transmitted to the cell multiplexing/demultiplexing unit 511.

Further, cells transmitted from the cell multiplexing/ demultiplexing unit 511 to the down-unit 5122 are subjected to reception processing in the ATM processor 51224, and then synthesized into SAR-PDU frames in the ALL5 processor 51223. In the IP processor 51222, the SAR-PDU frames are subjected to the IP processing such as setting of the address information, etc. according to the registration content of the table 51225 to be converted to IP packets, and then transmitted from the frame processor 51221 to a transmission path. At this time, the registration content of each table is renewed by the IP flow manager 5123 according to the message of IFMP communicated with the IP controller 53.

Figure 7:
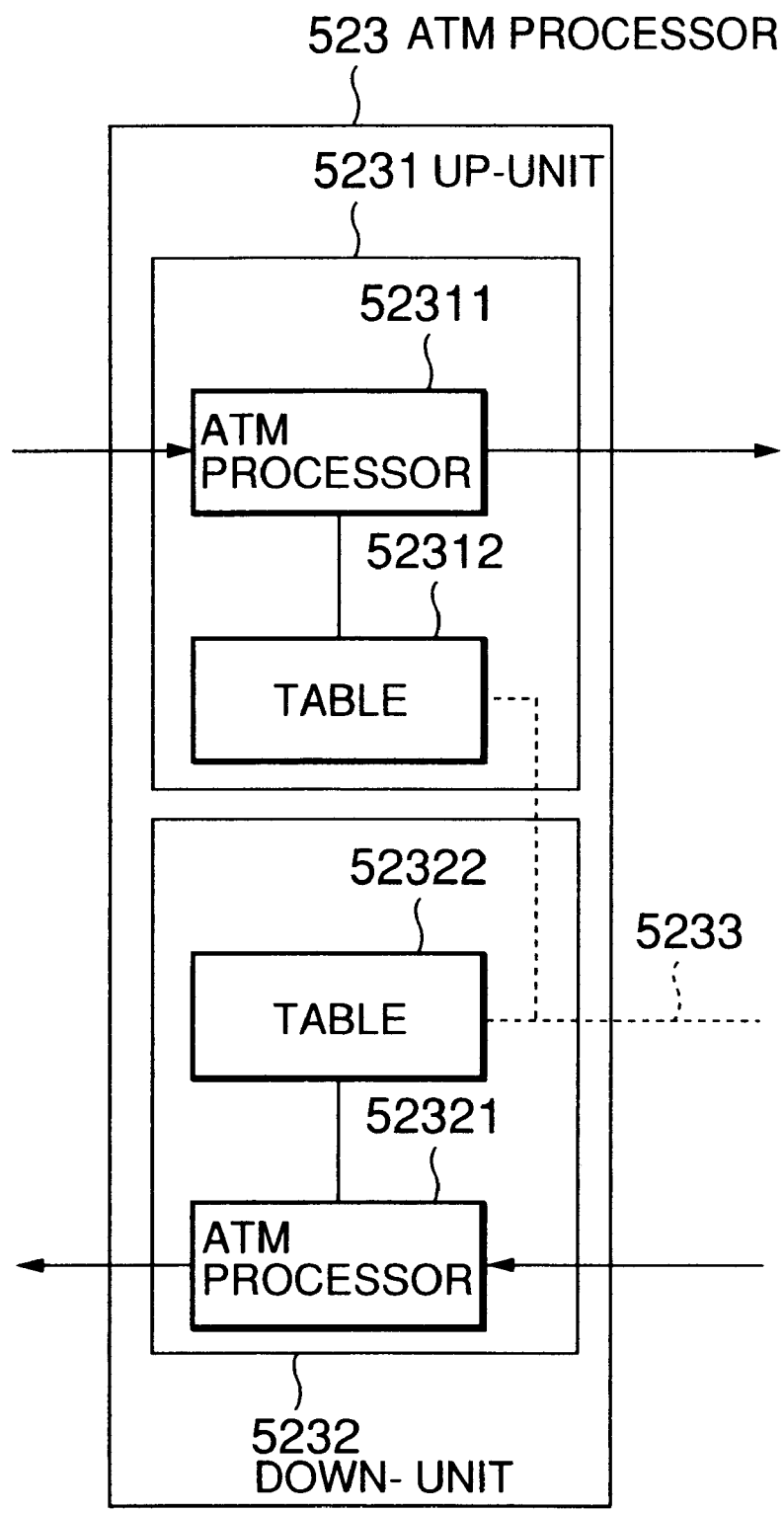
FIG. 7 is a diagram showing an example of the constitution of an ATM interface.

FIG. 7 shows the constitution of the ATM interface 523.

As shown in FIG. 7, each of the up-unit 5231 and the down-un it 5232 of the ATM interface 523 comprises the ATM processor for performing the conversion of the identification information of the header portions of cells to be transmitted, etc., and the table used for the conversion of the identification information. Here, the registration content of each table is renewed according to control information which is transmitted from the switch controller 522 through a control line 5233.

Figure 8:
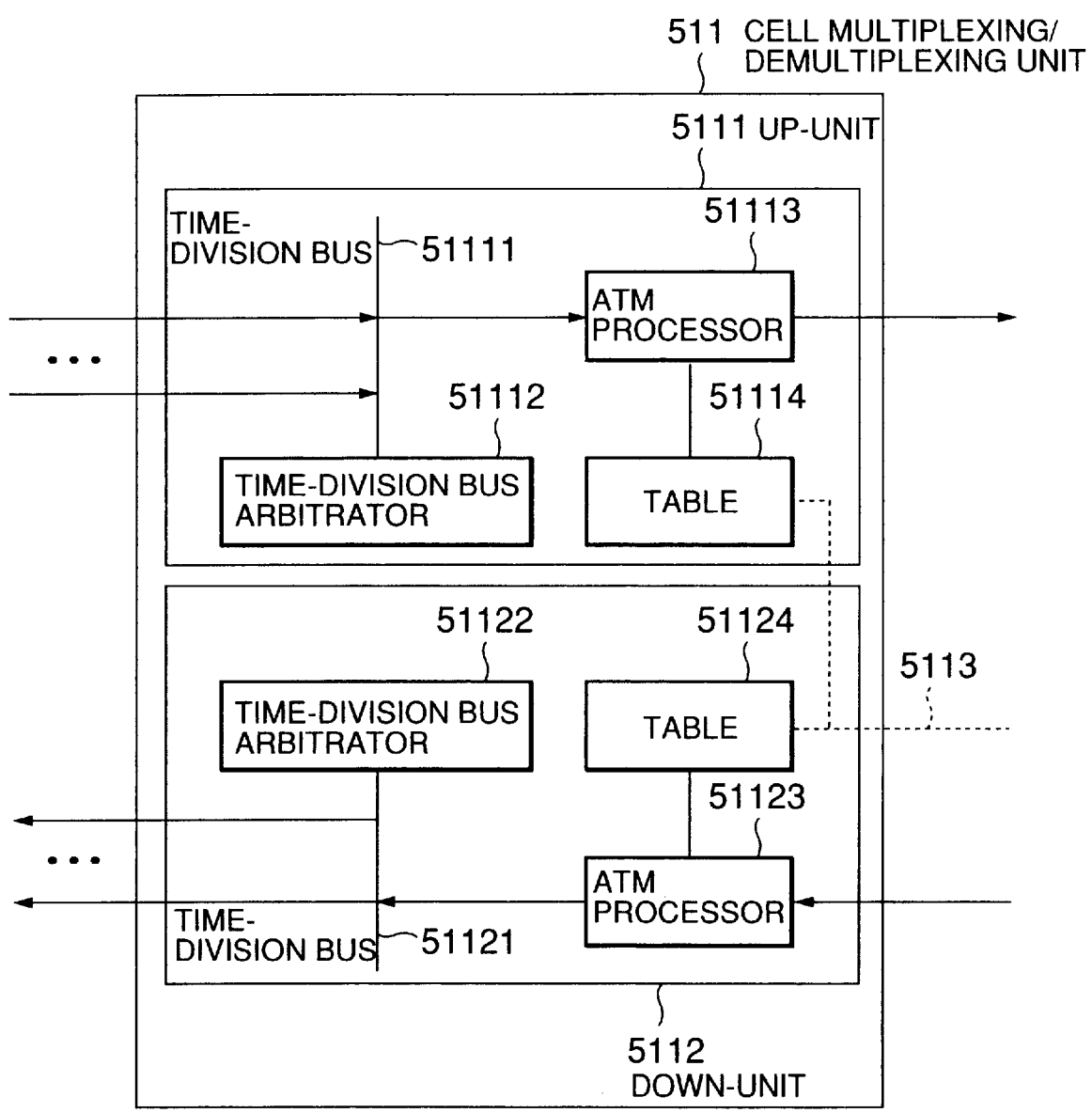
FIG. 8 is a diagram showing the an example of constitution of a cell multiplexing/demultiplexing unit.

FIG. 8 shows the constitution of the cell multiplexing/ demultiplexing unit 511.

As shown in FIG. 8, each of the up-unit 5111 and the down-unit 5112 of the cell multiplexing/demultiplexing unit 511 comprises a time-division bus used for the multiplexing/ demultiplexing operation of cells, a time-division bus arbitrator for arbitrating the transmission timing of cells on the time-division bus, an ATM processor for performing the conversion of the identification information of the header portions of the cells on the time-division bus, and a table used for the conversion of the identification information. Here, the registration content of each table is renewed by the control information transmitted from the switch controller 522 through the control line 5113.

In this constitution, cells which are transmitted from each of the interfaces 512 to 517 to the up-unit 5111 are transmitted to the time-division bus 51111 at a predetermined timing to be serialized by the time-division arbitrator 51112. The serialized cells on the time-division bus 51111 are transmitted to the physical port of the ATM switch 52 after the identification information of the header portions thereof is converted in the ATM processor 51113.

Further, cells transmitted from the above physical port to the down-unit 5112 are transmitted onto the time-division bus 51121 by the time-division bus arbitrator 51122 after the identification thereof is converted in the ATM processor 51123, and taken into the interfaces 512 to 517 at the transmission destination. In the above constitution, the timedivision bus may be made common to collectively transmit and arbitrate the up-side cells and the down-side cells. Further, the cell multiplexing/demultiplexing operation may be performed by means other than the time-division bus.

In an interface of the interfaces 512 to 517 which is connected to plural lo transmission paths, a parallel/serial converter is disposed at the connection portion of the interface with the transmission path so that the packets, etc. transmitted from the plural transmission paths are serialized and input and conversely the packets, etc, after switching are output to the corresponding paths.

Next, the operation of the IP switch 5 with multiplexer will. be described with respect to a case where the IP node 41 communicates with a neighboring node 6.

Figure 9:
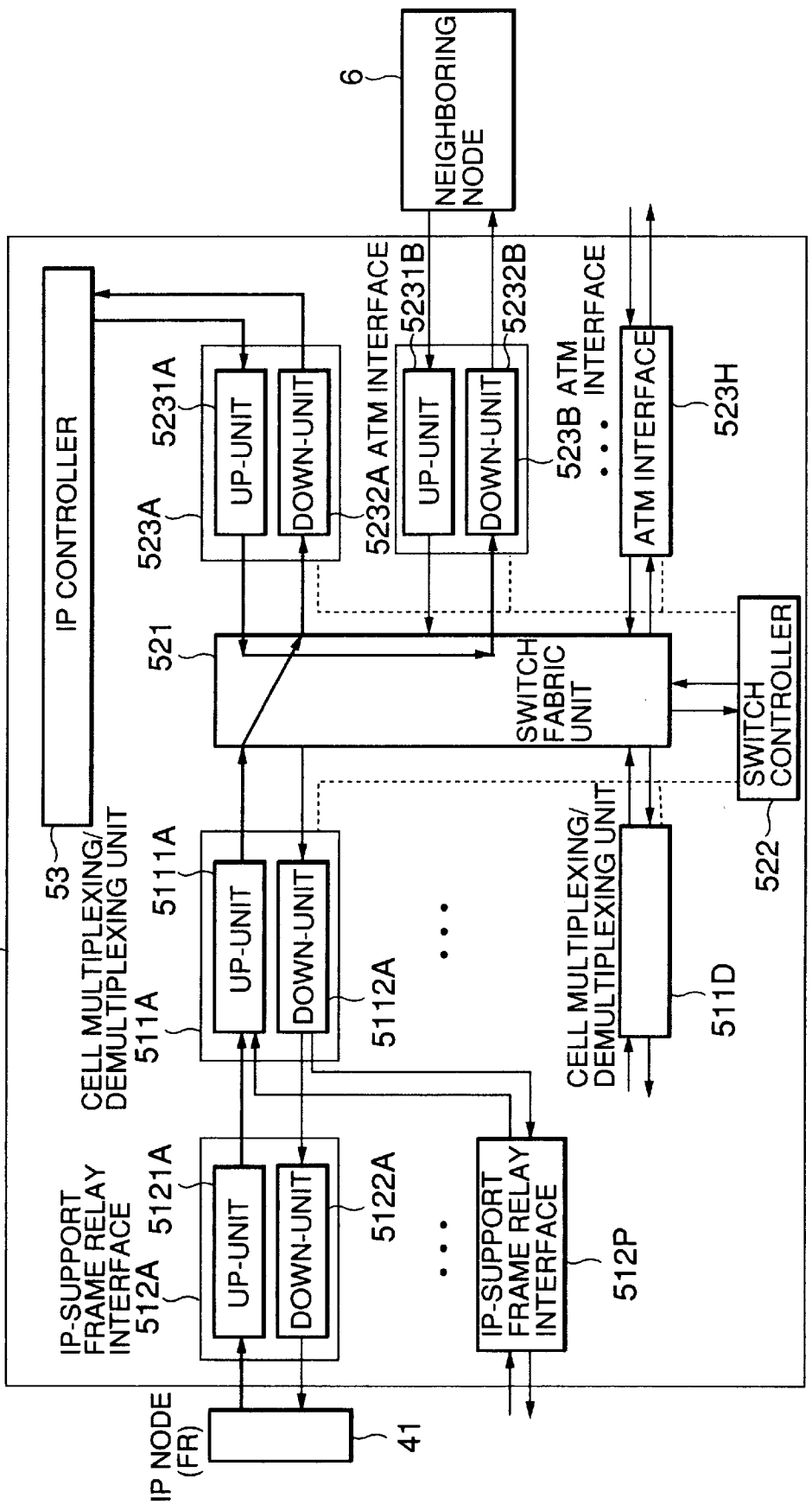
FIG. 9 is a diagram showing an example of a communication based on default VC of up-flow.
Figure 10:
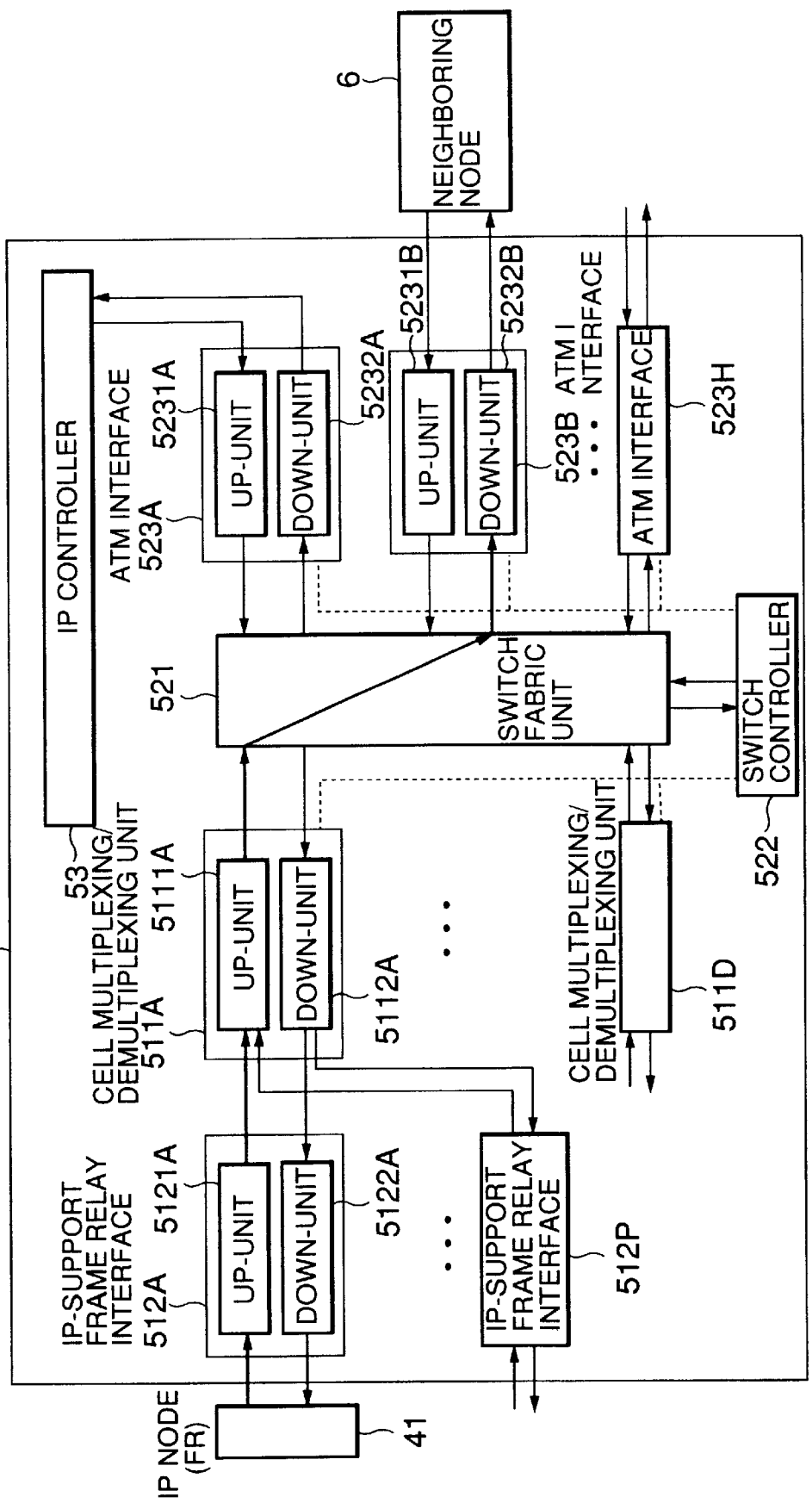
FIG. 10 is a diagram showing an example of a communication based on redirect VC of up-flow.

For the communication in the IP switch 5 with a multiplexer, there are provided a mode in which IP data are communicated through the IP controller 53 by the default VC as shown in FIG. 9 and a mode (cut through) in which IP data are communicated through no IP controller 53 by the redirect VC as shown in FIG. 10. Usually, the communication based on the default VC is performed at the start time, and thereafter the communication mode is shifted to communication based on the redirect VC. The setting of the redirect VC is performed by the protocol processing of IFMP and GSMP.

Here, the registration content of the table on the above operation will be described.

As shown in FIG. 11, the IP flow identifier and the local identifier of the IP packet of the redirect VC are registered in the table in the up-unit 5121A of the IP-support frame relay interface. All the IP packets for which no IP flow identifier is registered correspond to the default VC, that is, the first local identifier. The IP flow identifier comprises a source IP address x.x.x.x and a destination IP address y.y.y.y. As the IP flow identifier there may be used a combination of these IP addresses and the port number in the header of the upper protocol such as TCP, UDP or the like, a network address for identifying the network or the like.

As shown in FIG. 12, an output physical port number and an inside connection identifier are registered, matching with the multiplex port number and the value of the local identifier in the table of the up-unit 5111A of the cell multiplexing/demultiplexing unit 5111A. This registration is divided into a registration mode for default VC in which the output physical port number and the inside connection identifier are fixedly registered, and a registration mode for redirect VC in which they are renewed.

Figure 13:
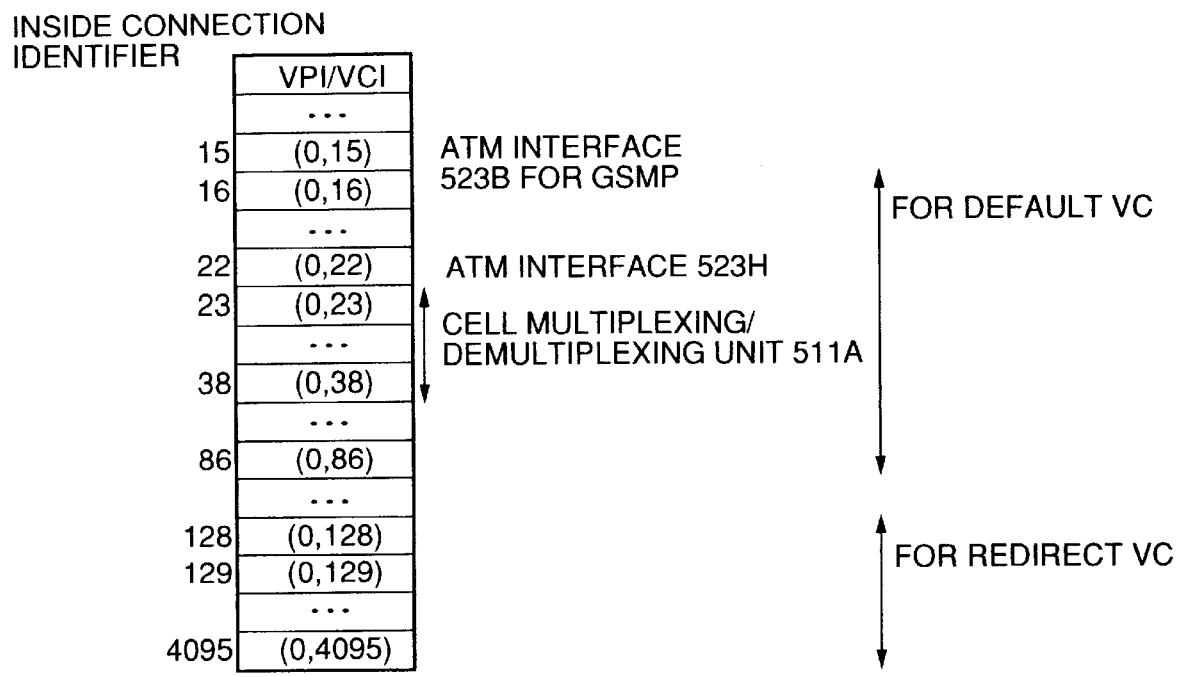
FIG. 13 is a diagram showing an example of a table of a down-unit A of the ATM interface.
Figure 14:
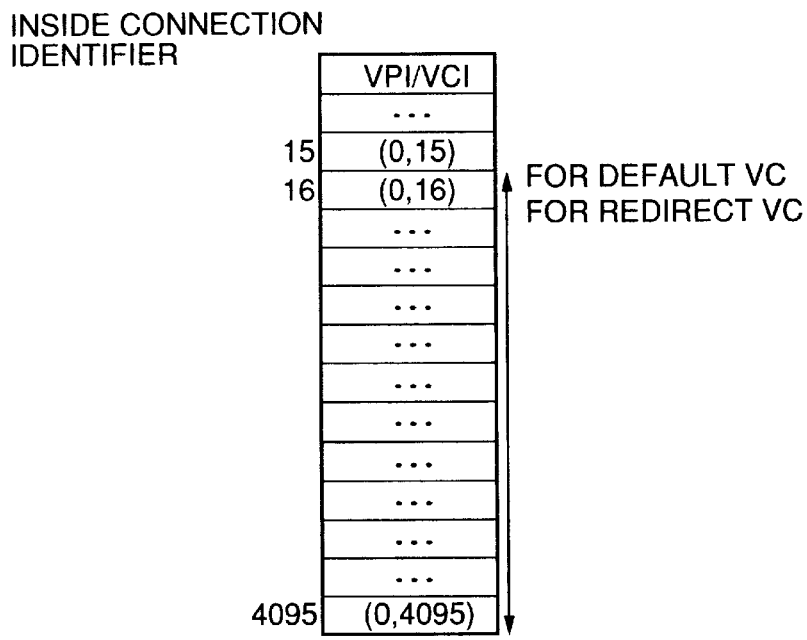
FIG. 14 is a diagram showing an example of a table of a down-unit B of the ATM interface.

Further, VPI/VCI is registered matching with the value of the inside connection identifier in the table 52322A of the down-unit 5232A of the ATM interface connected to the IP controller 53 as shown in FIG. 13. Likewise, VPI/VCI is also registered in match with the value of the inside connection identifier in the table 52322B of the down-unit 5232B of the ATM interface connected to a neighboring node as shown in FIG. 14. Further, the output physical port number and the inside connection identifier are registered matching with the value of VPINCI in the table 52312A of the up-unit 5231A of the ATM interface connected to the IP controller as shown in FIG. 15.

Figure 17A:
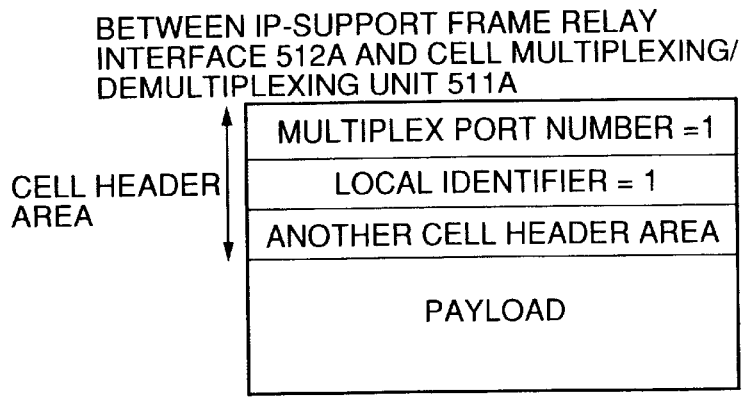
FIGS. 17A to 17C are diagrams showing an example (part 1) of a cell format in the up-flow.
Figure 17B:
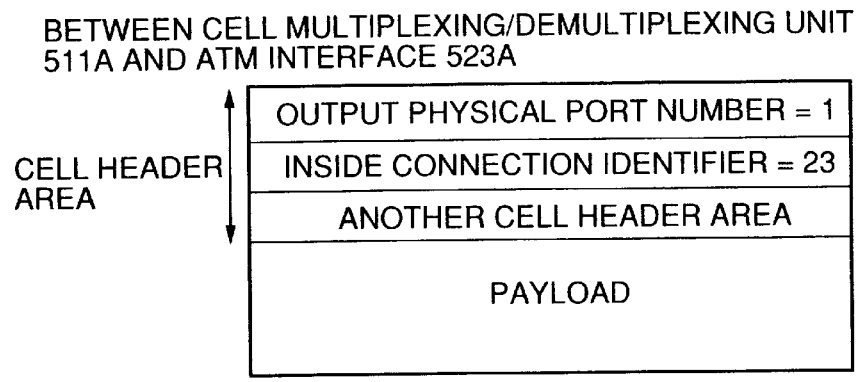
Figure 17C:
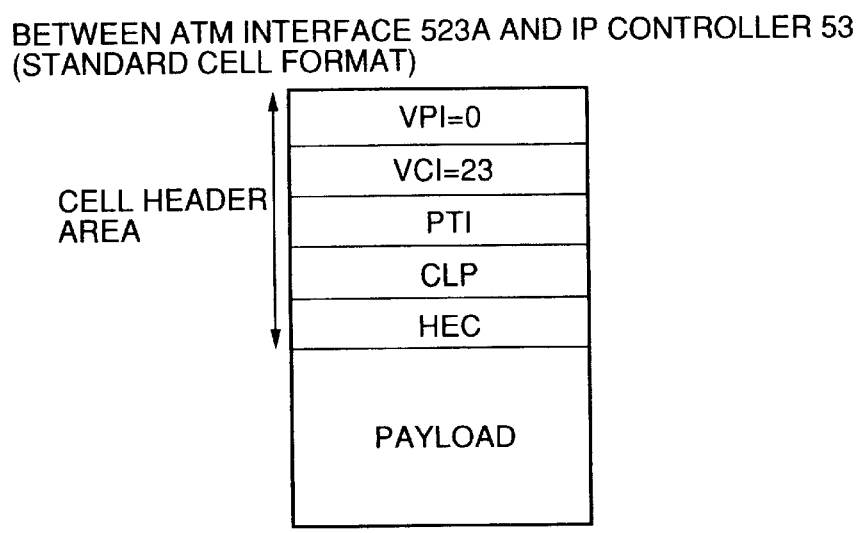
Figure 18A:
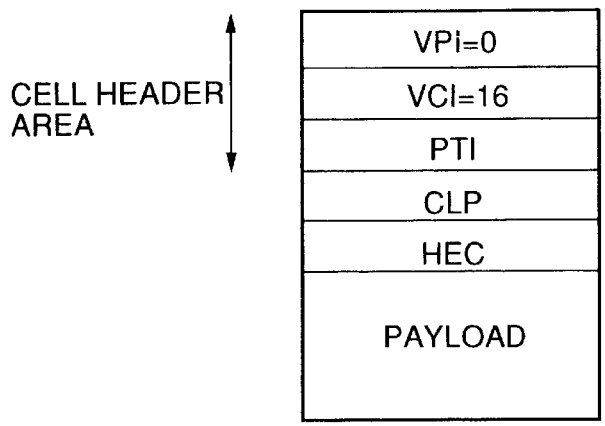
FIGS. 18A to 18C are diagrams showing an example (part 2) of the cell format in the up-flow.
Figure 18B:
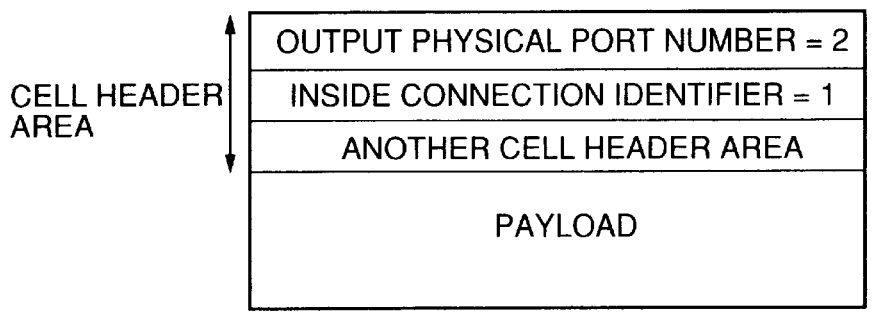
Figure 18C:
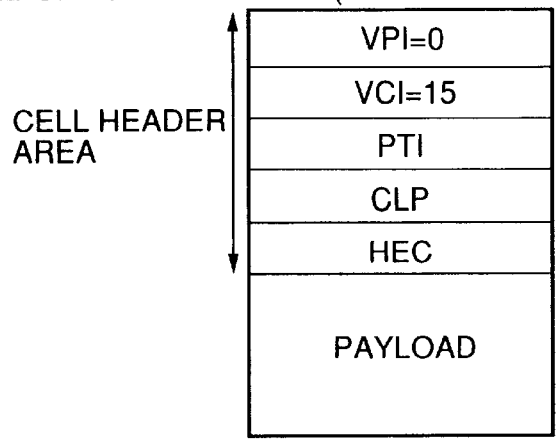

The communication based on the default VC which is performed according to the registration contents of the above tables will be described with reference to FIGS. 16 to 18.

In FIG. 16, an IP packet which is transmitted from the IP node 41 and for which the source IP address x.x.x.x and the destination IP address y.y.y.y are set is first converted to a cell (FIG. 17A) in which the first multiplex port number and the first local identifier are set to the header portion thereof in the up-unit 5121A of the IP-support frame relay interface because the corresponding IP flow identifier (x.x.x.x, y.y.y.y) is not registered in the table, and transmitted to the up-unit 5111A of the cell multiplexing/demultiplexing unit. The up-unit 5111A multiplexes the cell thus transmitted, then replaces the identification information of the header portion with the first output physical port number and the 23-rd inside connection identifier on the basis of the registration content of the table (FIG. 17B), and then transmits the cell to the switch fabric unit 521. This cell is transmitted to the down-unit 5232A of the ATM interface according to the output physical port number of the header portion thereof. An ATM header containing VPI/VCI of (0,2,3) is generated on the basis of the inside connection identifier of the header portion of the transmitted cell in the down-unit 5232A. The transmitted cell is converted to an ATM cell in a standard format (FIG. 17C) and then the ATM cell is transmitted to the IP controller 53. In the IP controller 53, an IP packet is generated from the ATM cell thus transmitted, a new output physical port and VPI/VCI of the corresponding default VC are determined on the basis of the value of the IP flow identifier of the IP packet by the IP processing, and the ATM cell (FIG. 18A) in which VPI/VCI is converted to (0,16) is transmitted to the up-unit 5231A of the ATM interface. The up-unit 5231A sets the second output physical port number and the first inside connection identifier in the header portion of the ATM cell thus transmitted, and transmits them to the ATM cell switch fabric unit 521 thereof. This ATM cell is transmitted to the down-unit 5232B of the ATM interface according to the output physical port number. In the down-unit 5232B of the ATM interface, VPI/VCI is set to (0,15) and then transmitted to the neighboring node 6.

Next, the processing for the cut-through will be described with reference to FIGS. 19 to 24.

In FIG. 19, when the IP controller 53 which receives the cell of IP data from the IP-support frame relay interface 512A judges that it can communicate the IP data by the redirect VC (for example, it is judged on the basis of the data amount per constant time which is input through one transmission path, and it is judged to perform the communication based on the redirect VC if the input data amount per constant time is large), the IP controller 53 outputs an add branch message (FIG. 20A) of GSMP for setting the redirect VC connection between the IP controller 53 and the IP node 41. This message is transmitted to the switch controller 522 through the ATM interface 523A and the switch fabric unit 521. The switch controller 522 generates two pieces of information for the connection setting on the basis of the transmitted message (FIGS. 20B and 20C), and transmits the respective pieces of information to the cell multiplexing/demultiplexing unit 511 and the ATM interface 523 respectively, whereby the registration for the redirect VC is added in each table of the up-unit 5111A of the cell multiplexing/demultiplexing unit and the down-unit 5232A of the ATM interface. The switch controller 522 returns to the IP controller 53 an add branch reply message for informing that the processing is completed.

The IP controller 53 which receives the add branch reply message generates and transmits a redirect message of IFMP (FIG. 20D) for instructing the IP-support frame relay interface 512A to switch the communication to the redirect VC. The message thus transmitted is transmitted through the switch fabric unit 521 and the cell multiplexing/demultiplexing unit 511A to the IP flow manager 5123 in the IP-support frame relay interface 512A. On the basis of the message thus transmitted, the IP flow manager 5123 registers into the table 51215A of the up-unit the content for altering the local identifier of the communication of the above IP packet to 2.

Figure 21:
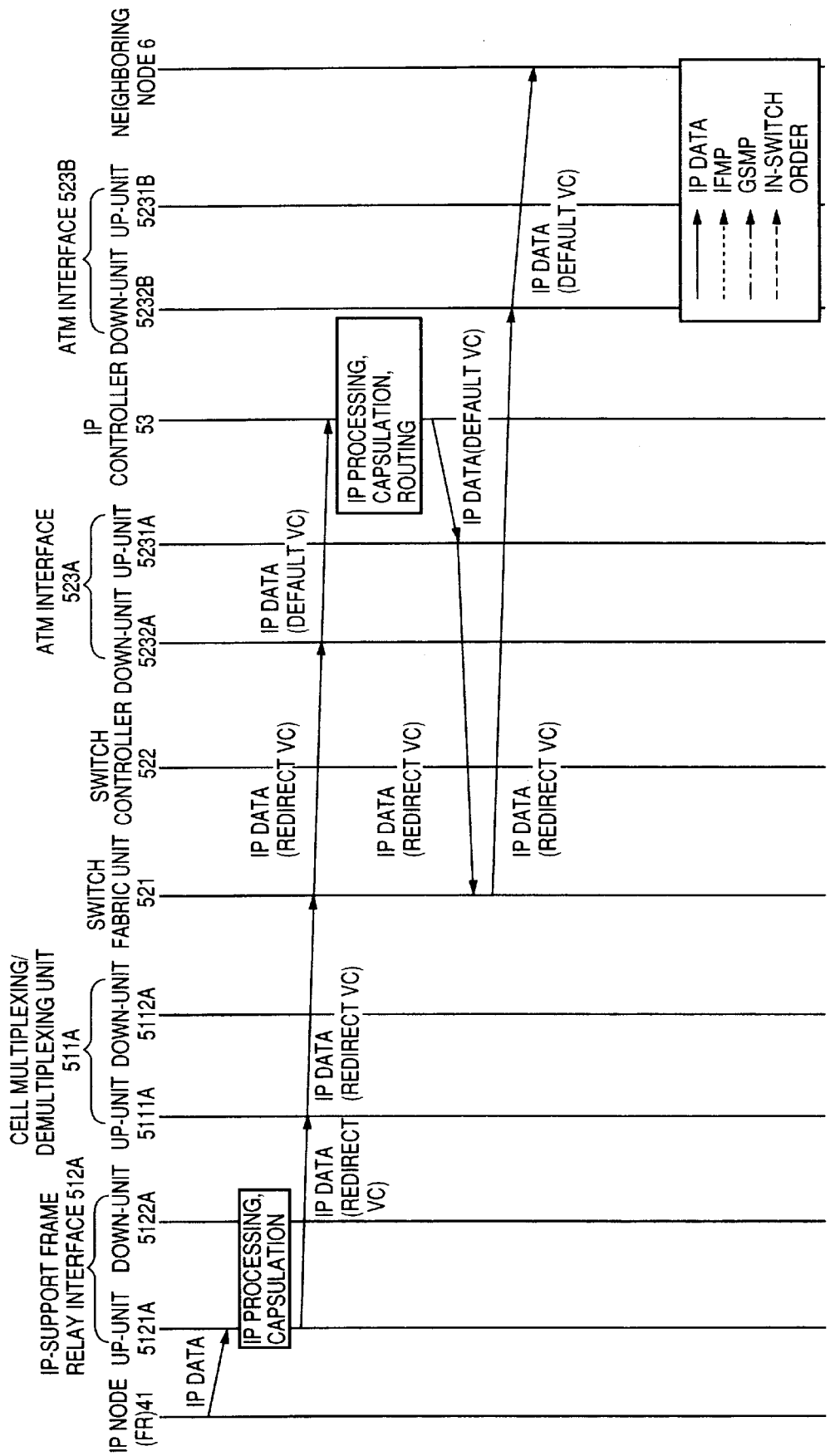
FIG. 21 is a diagram showing an example (part 3) of the up-flow processing sequence.
Figure 22A:
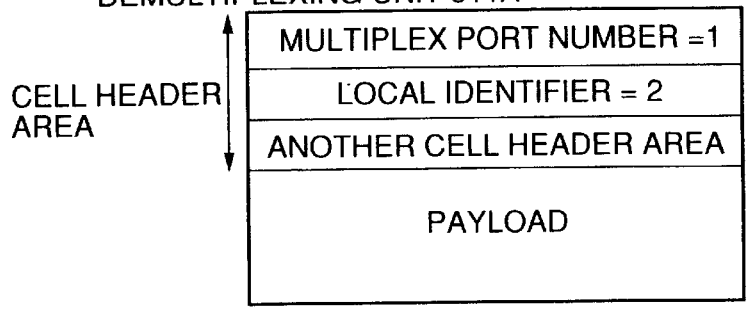
FIGS. 22A to 22C are diagrams showing an example (part 3) of the cell format in the up-flow.
Figure 22B:
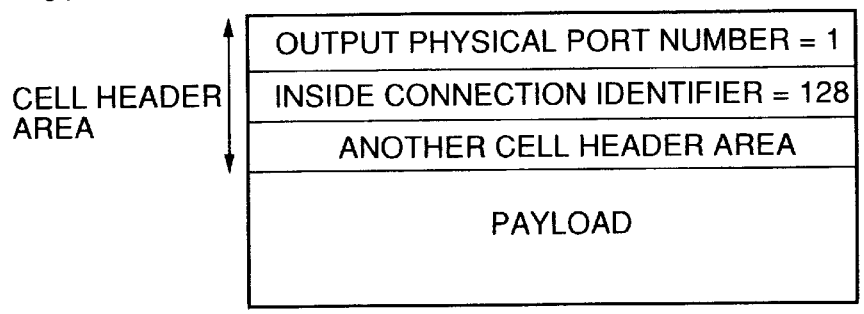
Figure 22C:
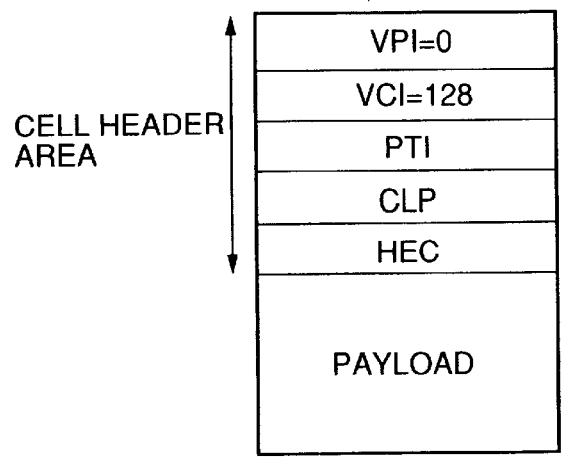
Figure 23:
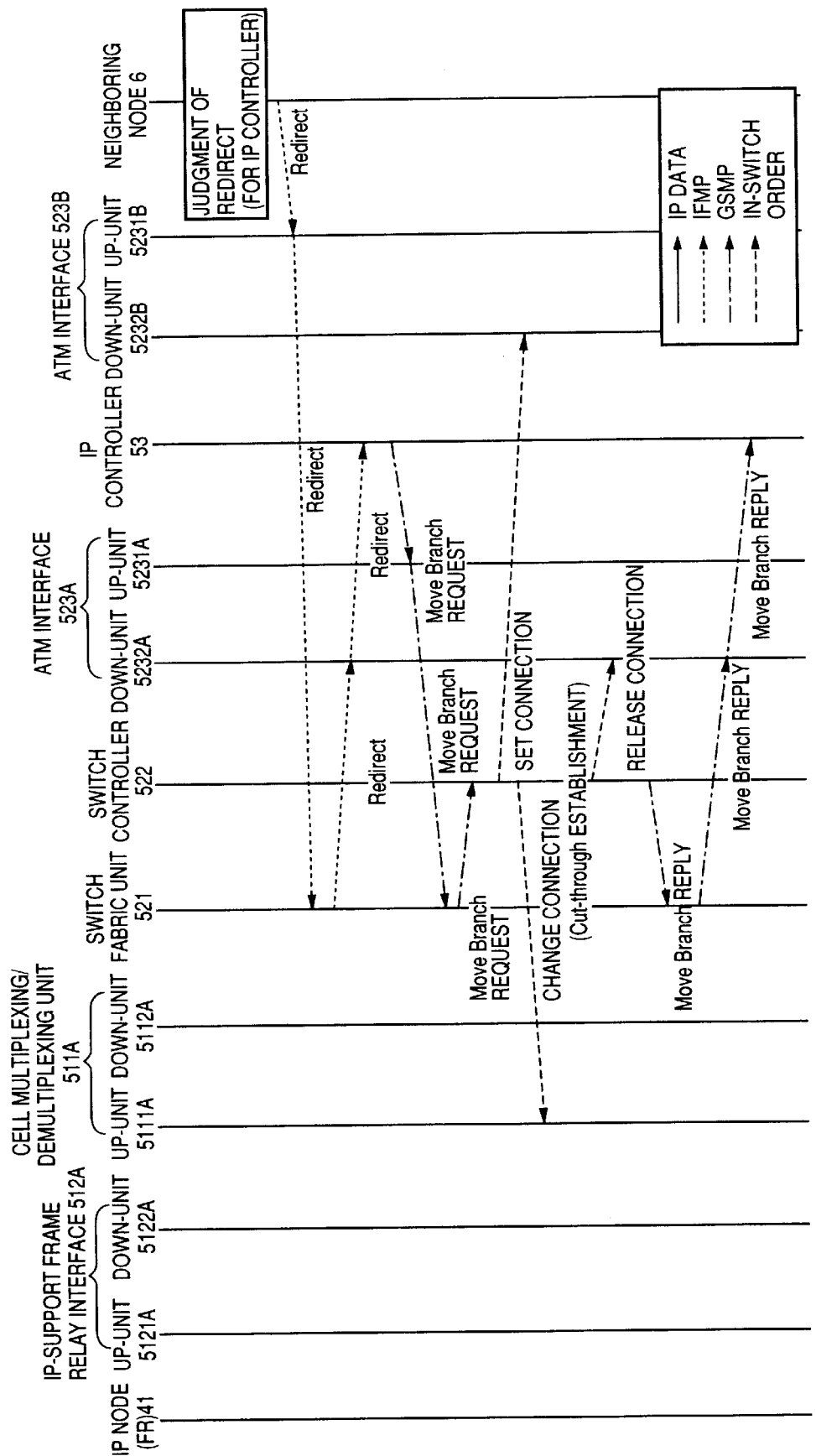
FIG. 23 is a diagram showing an example (part 4) of the processing sequence in the up-flow.
Figure 25:
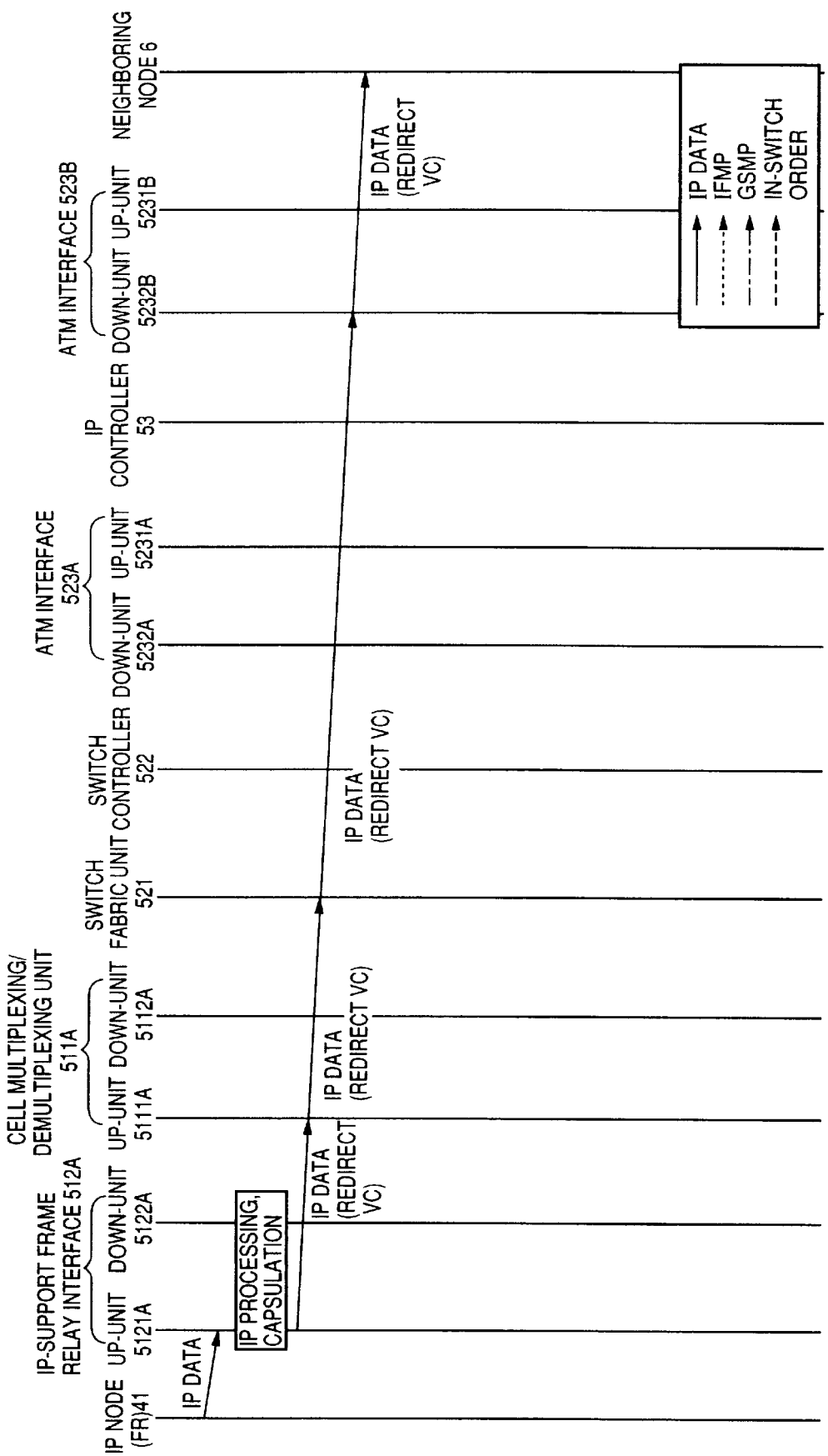
FIG. 25 is a diagram showing an example (part 5) of the up-flow processing sequence.
Figure 26A:
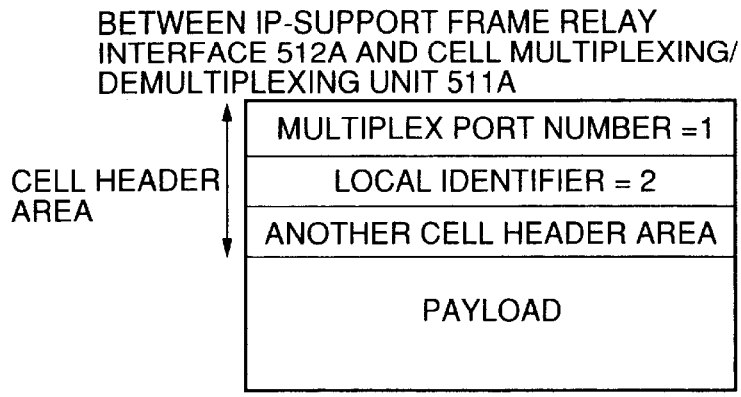
FIGS. 26A to 26C are diagrams showing an example (part 4) of the cell format in the up-flow.
Figure 26B:
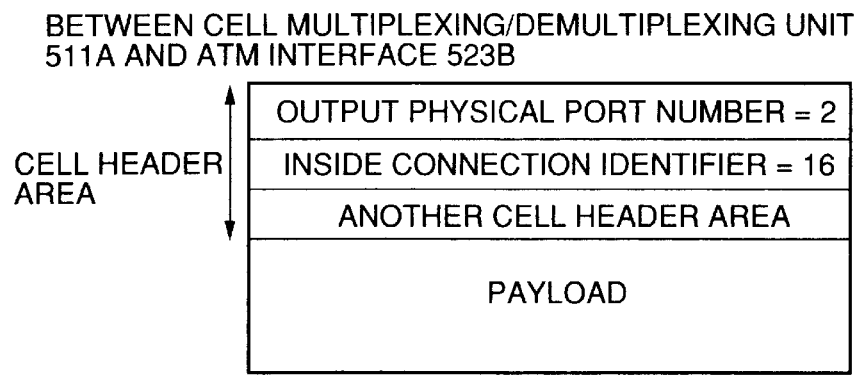
Figure 26C:
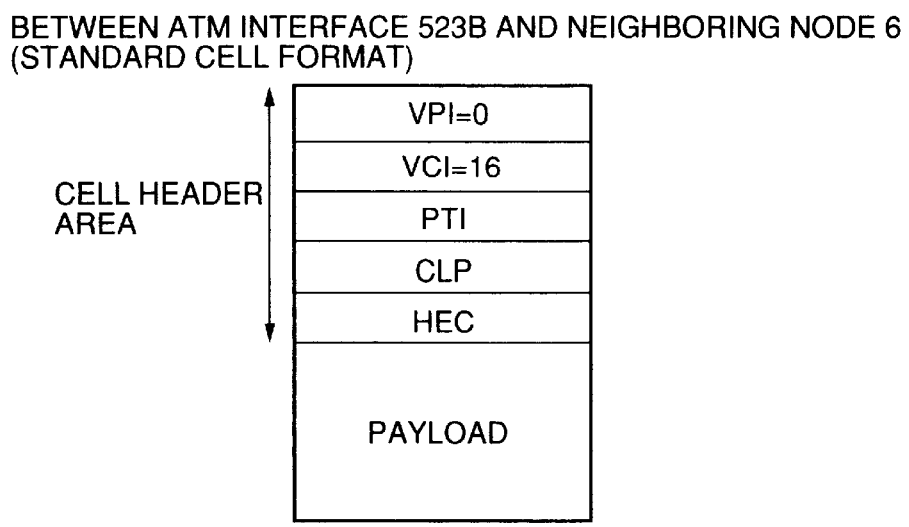

When the registration is completed, the IP data from the IP node 41 is transmitted to the IP controller 53 by the redirect VC as shown in FIG. 21. That is, in the IP-support frame relay interface 512A, the IP data are first converted to the cell (FIG. 22A) in which the second local identifier is set, and then the inside connection identifier is set in the cell thus converted in the cell multiplexing/demultiplexing unit 511A (FIG. 22B). Thereafter, in the ATM interface 523A the cell is converted to an ATM cell in which VPI/VCI of (0, 128) is set (FIG. 22C), and transmitted to the IP controller 53. As in the case of FIG. 16, the ATM cell is transmitted from the IP controller 53 to the neighboring node 6 by the default VC.

When the neighboring node 6 receiving the IP data from the IP node 41 judges that it can communicate the IP data by the redirect VC, the neighboring node 6 generates a redirect message of IFMP (FIG. 24A) which indicates the switching operation of the communication mode to the communication based on the redirect VC, and transmits the message to the IP controller 53. In response to this message, the IP controller 53 generates a move branch message of GSMP for setting the connection of the redirect VC between the neighboring node 6 and the switch fabric unit 521 (FIG. 24B), and transmits the message to the switch controller 522. In response to this message, the switch controller 522 generates two pieces of control information (FIGS. 24C and 24D) for the connection setting, and transmits these control information to the ATM interface 523B and the cell multiplexing/demultiplexing unit 511A, respectively, whereby the registration content of each table of the down-unit 5232B of the ATM interface and the up-unit 5111A of the cell multiplexing/demultiplexing unit is renewed, and the cut-through for connecting the IP node 41 and the neighboring node 6 to each other through no IP controller 53 by the redirect VC is established. Thereafter, the switch controller 522 transmits the control information (FIG. 24E) for releasing the connection to the down-unit 5232A of the ATM interface, thereby releasing the connection of the redirect VC before the switching operation. Finally, it returns to the IP controller 53 a move branch reply message for notifying the completion of the processing.

Next, the communication after the cut-through is established will be described with reference to FIGS. 25 and 26A–26C.

When the cut-through is established, all the communications from the IP node 41 to the neighboring node 6 are performed by the redirect VC through no IP controller. That is, the IP packet from the IP node 41 are converted to the cell (FIG. 26A) in the IP-support frame relay interface 512A, and then transmitted to the cell multiplexing/demultiplexing unit 511. The second physical port number is set for this cell in the cell multiplexing/demultiplexing unit 511 (FIG. 26B), and then this cell is transmitted through the switch fabric unit to the down-unit 5232B of the ATM interface. Thereafter, in the down-unit 5232B of the ATM interface, the cell is converted to an ATM cell (FIG. 26C) in which VPINCI is set to (0,16), and then transmitted to the neighboring node 6.

The above description is made on the operation of the IP switch 5 with multiplexer when the communication from the IP node 41 to the neighboring node 6 is performed.

Next, the operation when the communication from the neighboring node 6 to the IP node 41 is performed will be described.

Figure 27:
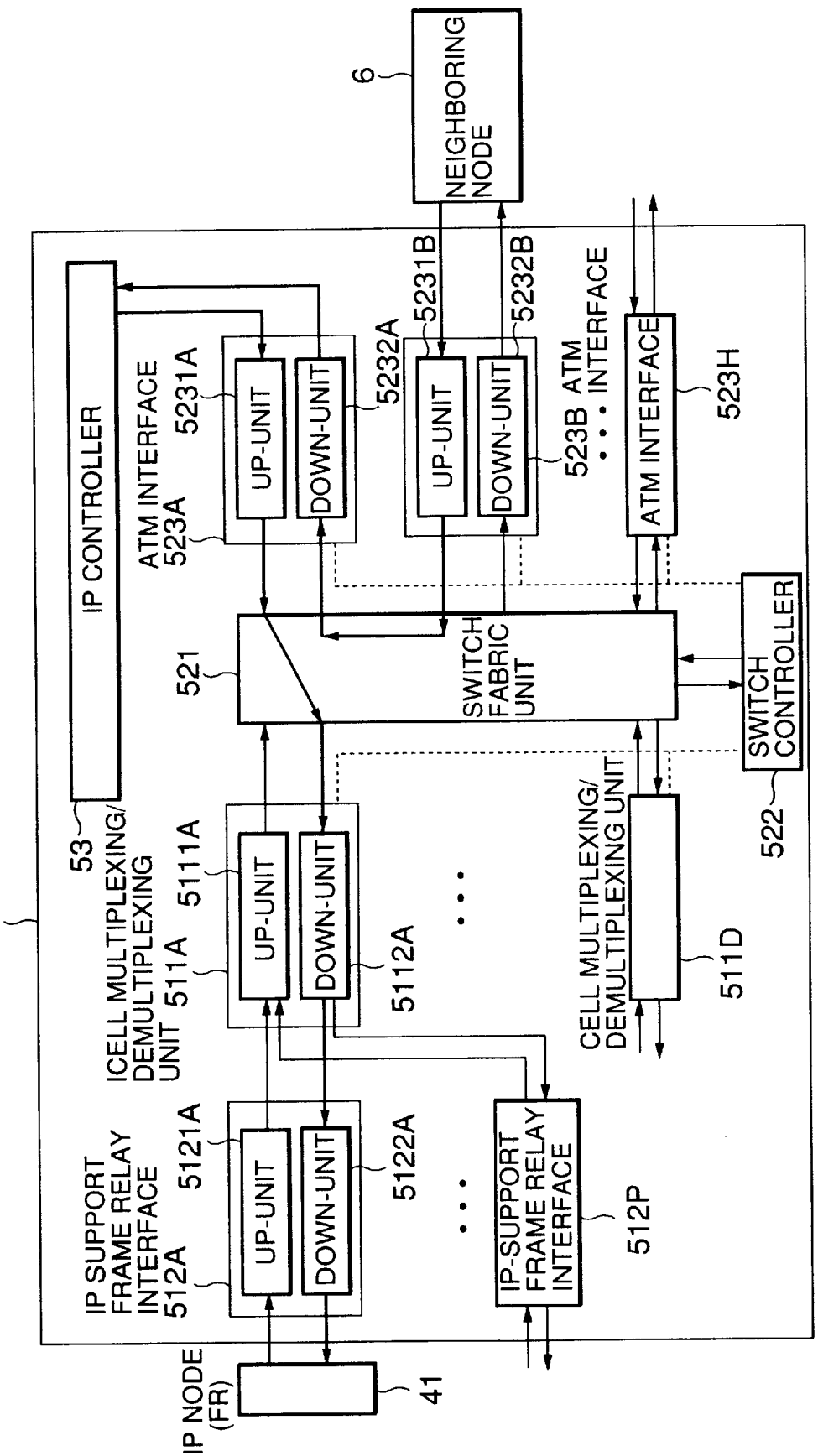
FIG. 27 is a diagram showing an example of a communication based on default VC of the down-flow.
Figure 28:
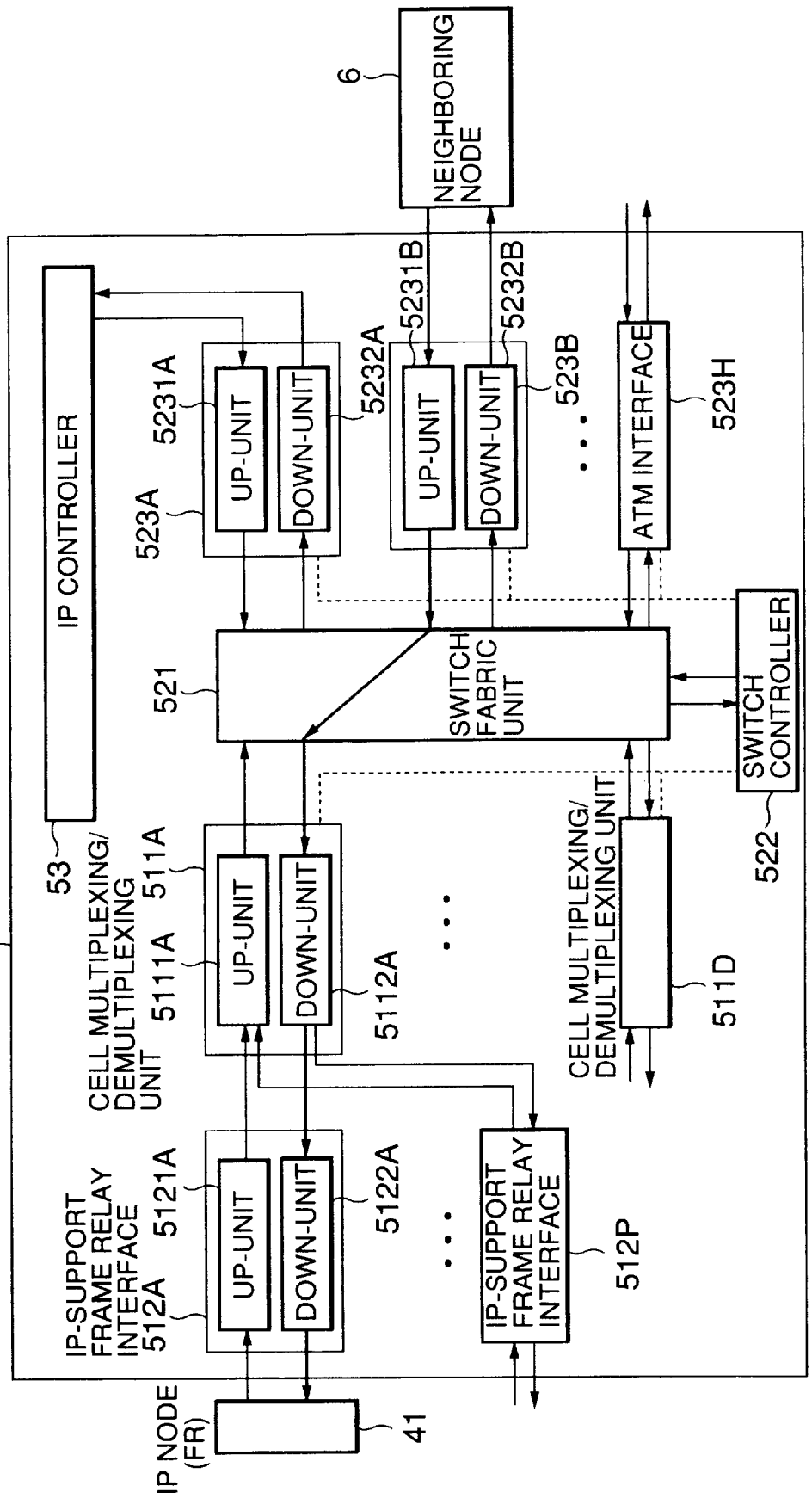
FIG. 28 is a diagram showing an example of a communication based on redirect VC of the down-flow.

In this communication, the same operation as described above is performed. The communication status is also shifted from the communication through the IP controller 53 on the basis of the default VC as shown in FIG. 27 to the communication through no IP controller 53 on the basis of the redirect VC as shown in FIG. 28.

Here, the registration content of the table on the above operation will be described.

As shown in FIG. 29, the local identifier and the IP flow identifier of the IP packet of the redirect VC are registered in association with each other in the table of the down-unit 5122A of the IP-support frame relay interface.

Further, the multiplex port number and the local identifier are registered in advance in association with the value of the inside connection identifier as shown in FIG. 30. The registration of these values is divided into a registration mode for default VC in which the values are fixedly registered, and a registration mode for redirect VC in which the values are renewed.

Figure 31:
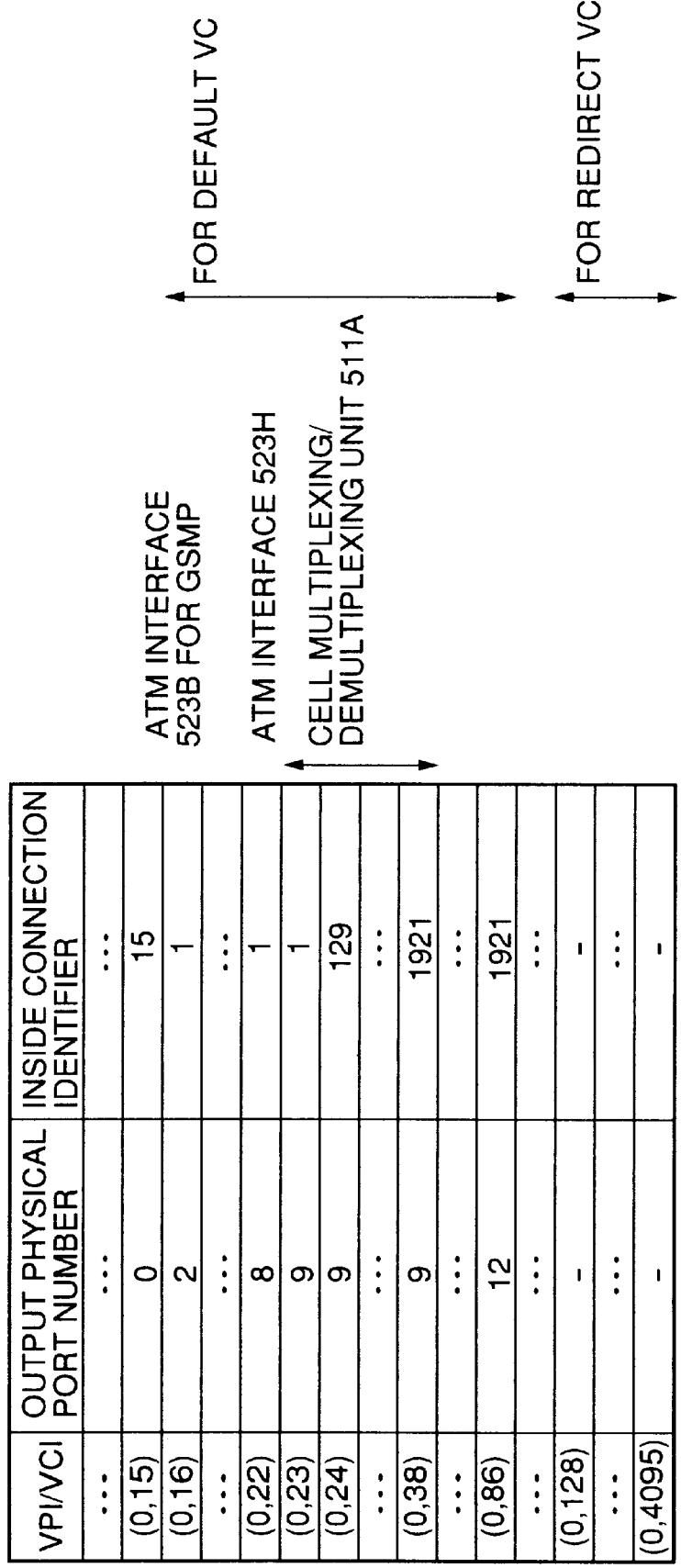
FIG. 31 is a diagram showing an example of a table of an ATM interface up-unit A.
Figure 32:
FIG. 32 is a diagram showing an example of a table of an ATM interface up-unit B.

As shown in FIGS. 31 and 32, the output physical port number and the inside connection identifier are registered in association with the value of VPI/VCI in each table of the up-unit 5231A and the up-unit 5231B of the ATM interface.

Figure 33:
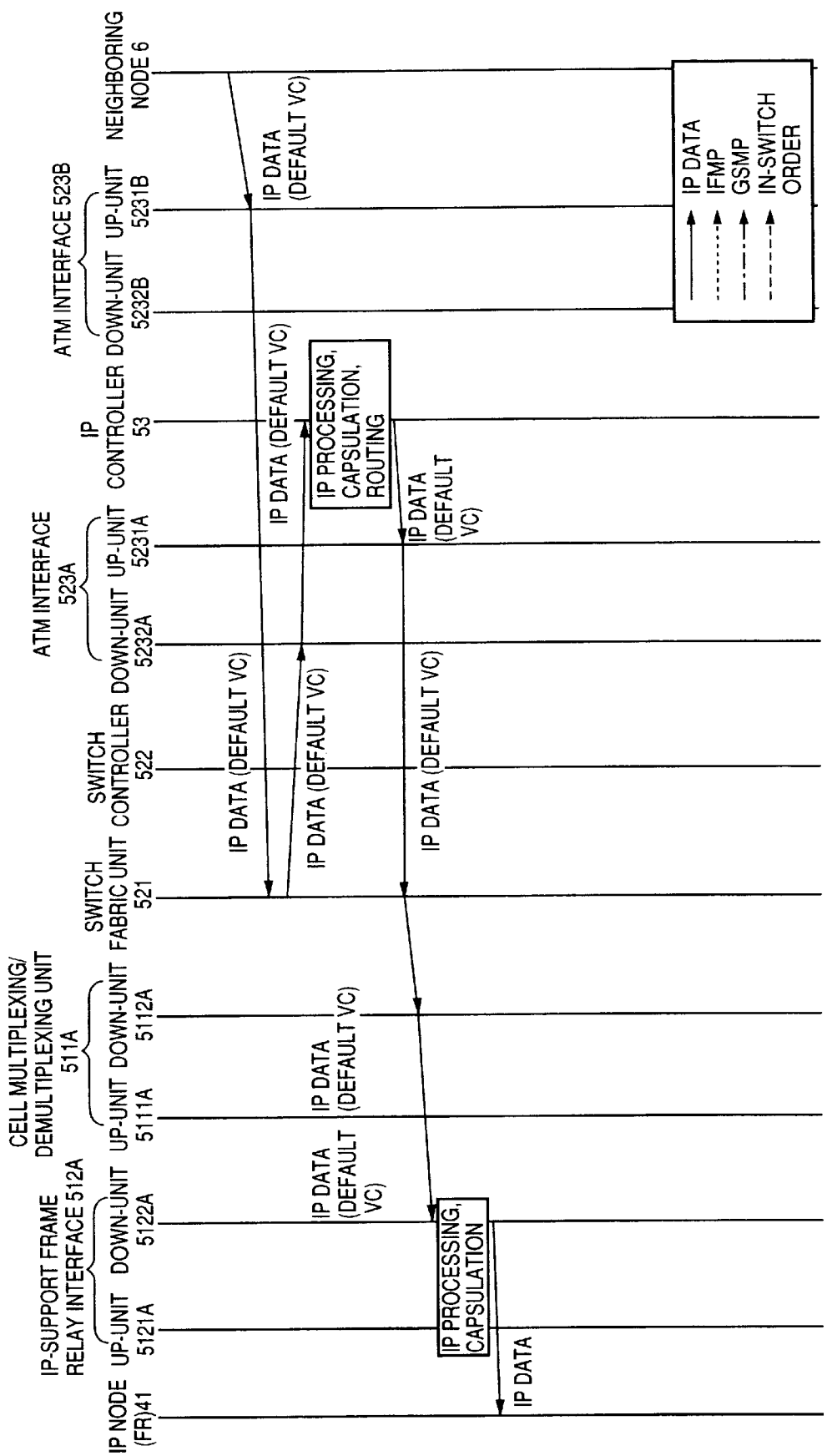
FIG. 33 is a diagram showing an example (part 1) of the processing sequence in the down-flow.
Figure 34A:
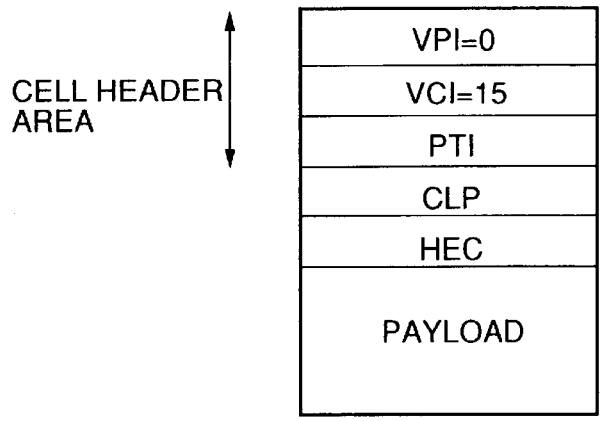
FIGS. 34A to 34C are diagrams showing an example (part 1) of the cell format in the down-flow.
Figure 34B:
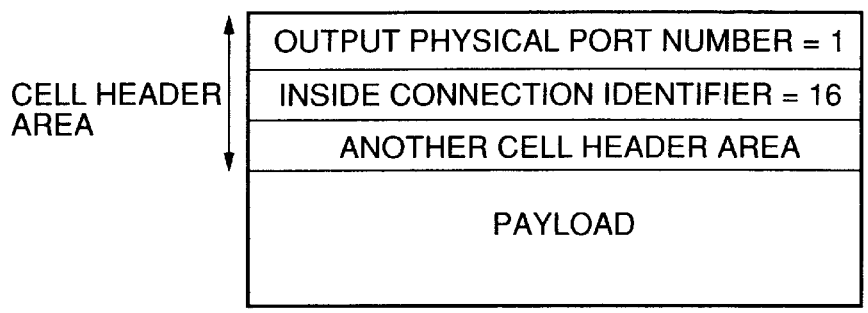
Figure 34C:
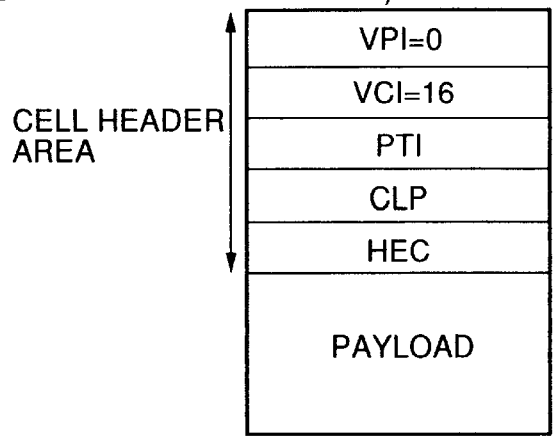

The communication based on the default VC which is performed according to the registration content of the above table will be described with reference to FIGS. 33 to 35.

Figure 35A:
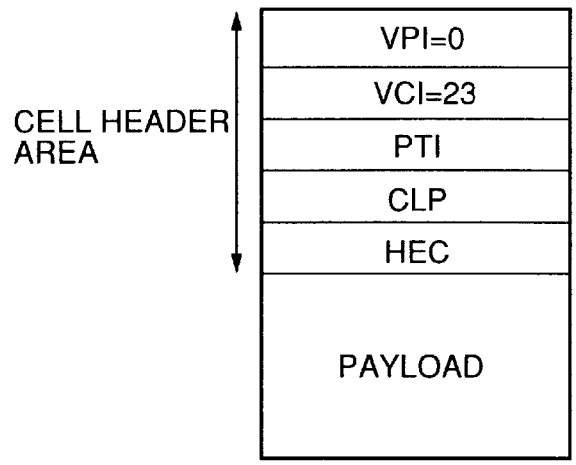
FIGS. 35A to 35C are diagrams showing an example (part 2) of the cell format in the down-flow.
Figure 35B:
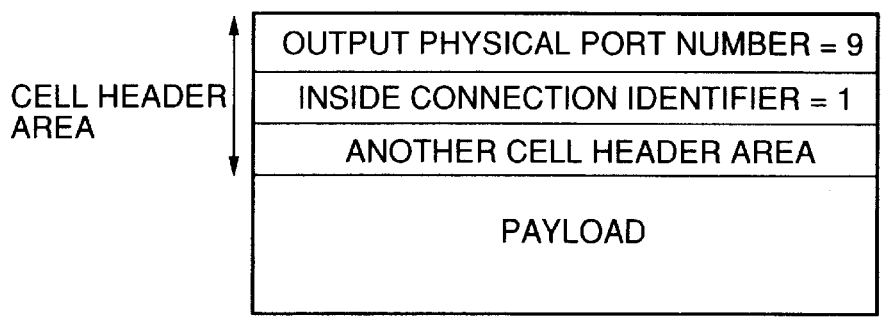
Figure 35C:
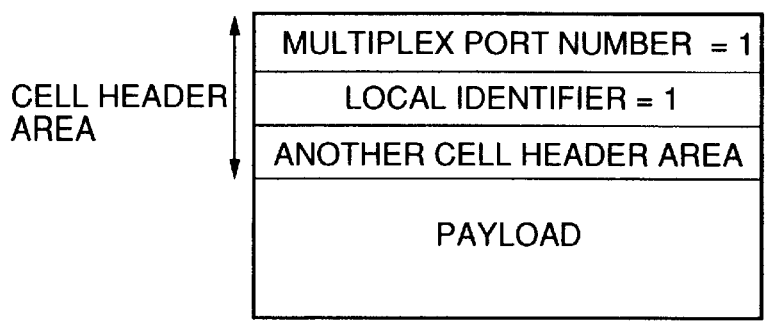

The ATM cell (FIG. 34A) transmitted from the neighboring node 6 is processed in the up-unit 5231B of the ATM interface so that the first output port number and the 16-th inside connection identifier are set therein (FIG. 34B), and then transmitted through the switch fabric unit 521 to the ATM interface 523A. The TM interface 523A sets VPI/VCI of (0,16) to the transmitted cell (FIG. 34C), and transmits the ATM cell to the IP controller. The IP controller performs the IP processing on the ATM cell and outputs the ATM cell in which VPI/VCI is converted to (0,23) (FIG. 35A). The output cell is processed in the up-unit 5231A of the ATM interface so that the ninth output port number and the first inside connection identifier are set (FIG. 35B), and transmitted through the switch fabric unit 521 to the cell multiplexing/demultiplexing unit 511A. The cell multiplexing/demultiplexing unit 511A sets the first multiplex port number and the first local identifier corresponding to the inside connection identifier of the transmitted cell (FIG. 35C), and outputs the cell. This cell is taken into the IP-support frame relay interface 512A to be converted to the IP packet, and transmitted to the IP node 41.

Next, the processing for the cut-through will be described with reference to FIGS. 36 to 41.

Figure 36:
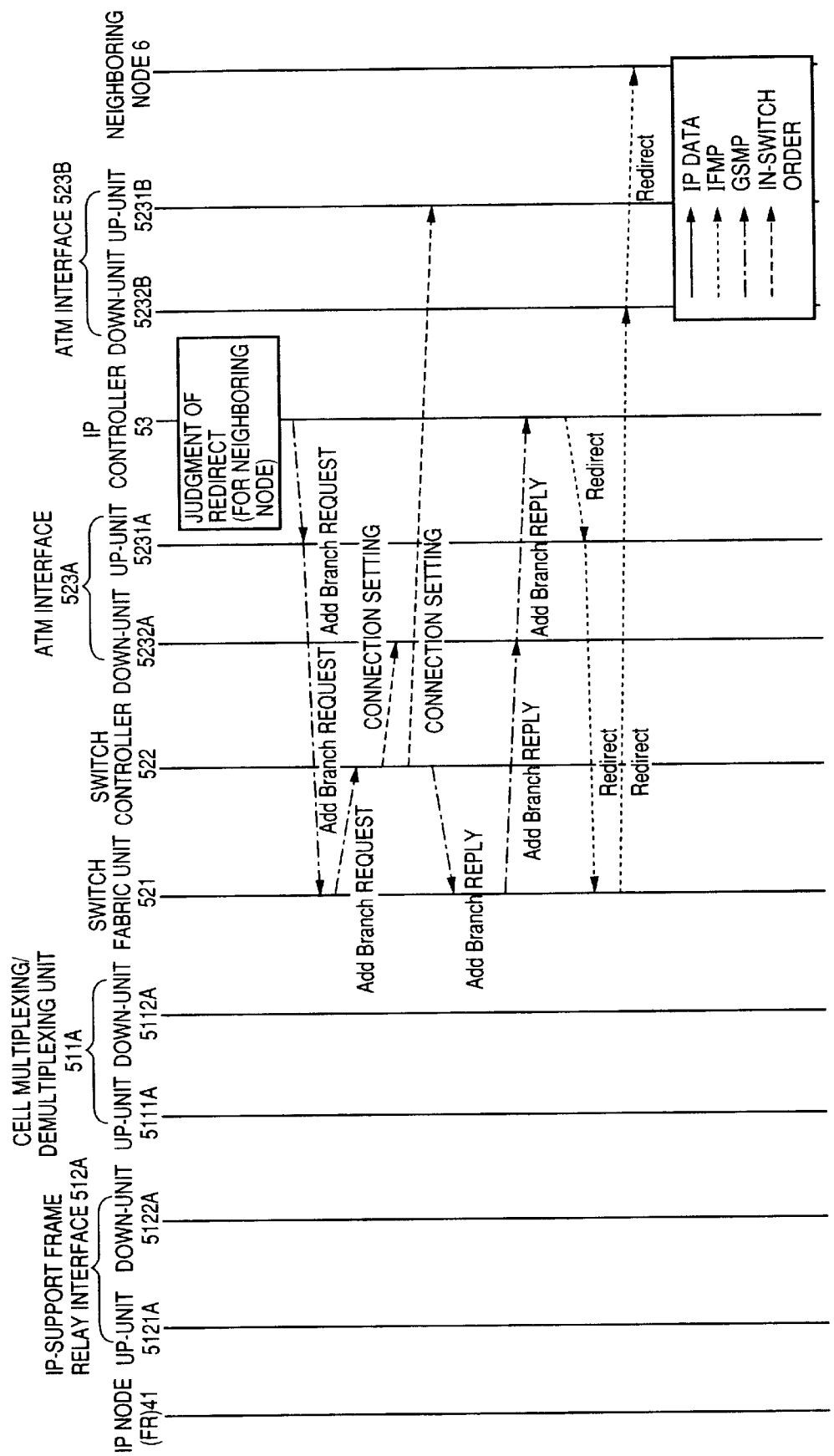
FIG. 36 is a diagram showing an example (part 2) of the processing sequence in the down-flow.

In FIG. 36, when the IP controller 53 receiving the ATM cell from the neighboring node 6 judges that the cell can be communicated on the basis of the redirect VC, the IP controller 53 generates an add branch message of GSMP (FIG. 37A), and transmits the message to the switch controller 522. The switch controller 522 generates control information for the connection setting on the basis of the message thus transmitted (FIGS. 37B and 37C), and transmits the control information to the down-unit 5232A and the up-unit 5231B of the ATM interface. On the basis of the control information, the registration for redirect VC is performed on each table of the down-unit 5232A and the up-unit 5231B of the ATM interface. The IP controller 53 generates a redirect message (FIG. 37D) of IFMP in response to the add branch reply message transmitted from the switch controller 522 after the above registration, and transmits the message to the neighboring node 6. The neighboring node 6 receiving this message sets to the ATM cell VPI/VCI of (0,17) which is indicated by the message, and transmits it.

Figure 38:
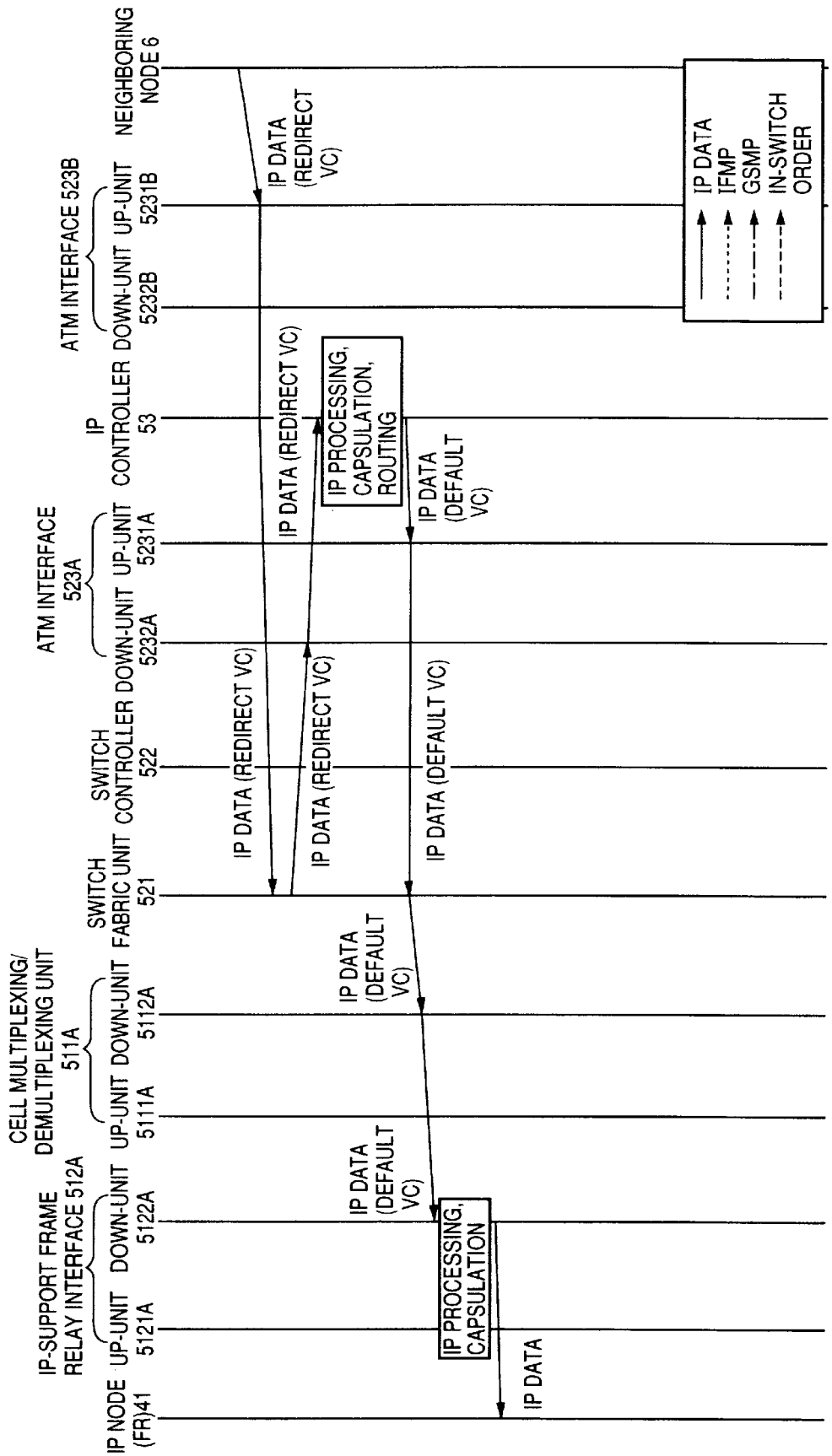
FIG. 38 is a diagram showing an example (part 3) of the processing sequence in the down-flow.
Figure 39A:
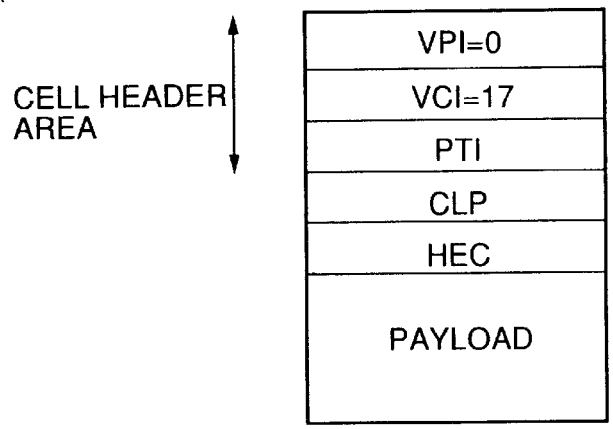
FIGS. 39A to 39C are diagrams showing an example (part 3) of the cell format in the down-flow.
Figure 39B:
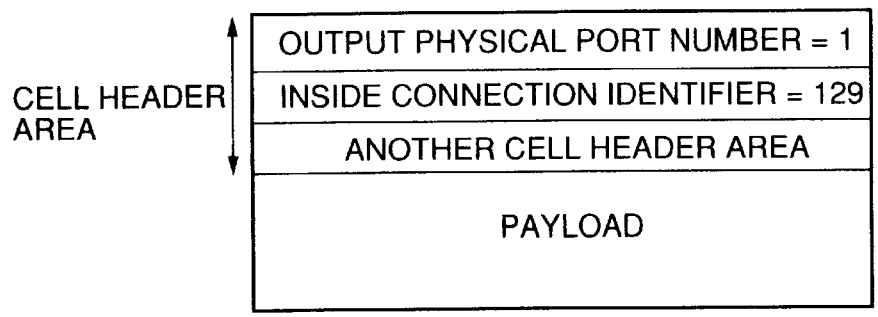
Figure 39C:
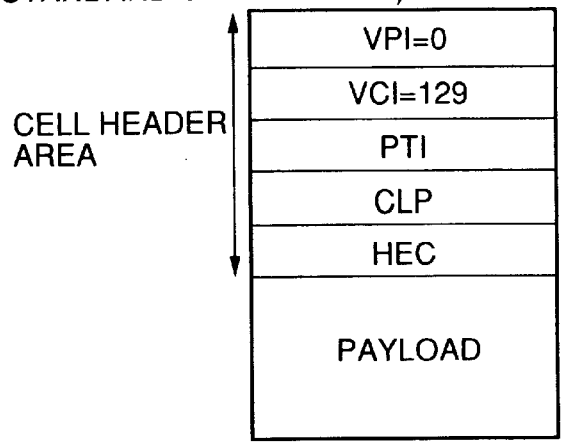

Through the above processing, the ATM cell transmitted by the neighboring node 6 is transmitted to the IP controller 53 on the basis of the redirect VC as shown in FIG. 38. Here, as shown in FIGS. 39A, 39B and 39C, the ATM cell is transmitted to the IP controller 53 while the identification information of the header portion is successively converted. The communication from the IP controller 53 to the IP-support frame relay interface 512A is performed on the basis of the default VC as in the case of FIG. 33.

Figure 40:
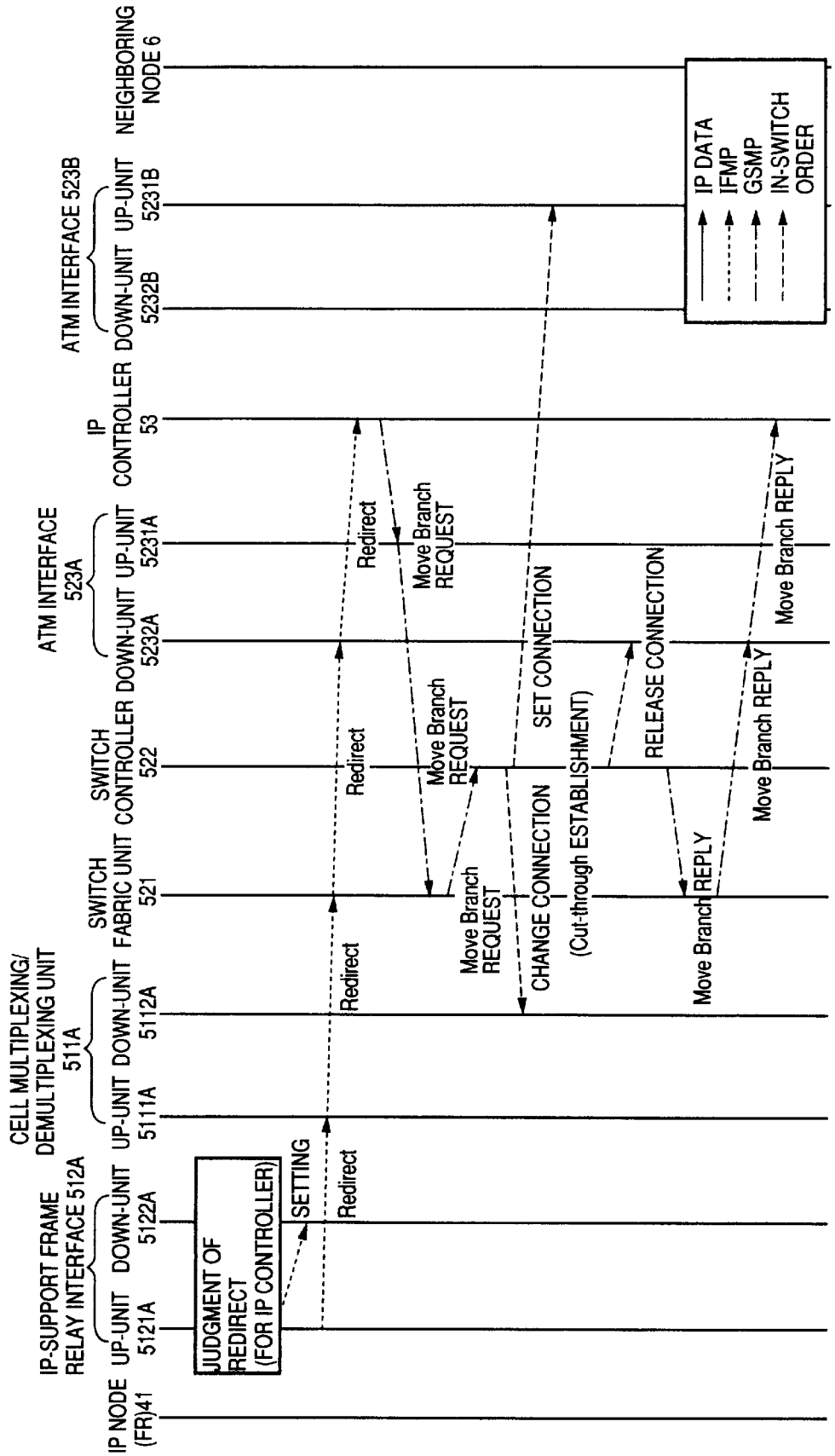
FIG. 40 is a diagram showing an example (part 4) of the processing sequence in the down-flow.
Figure 43A:
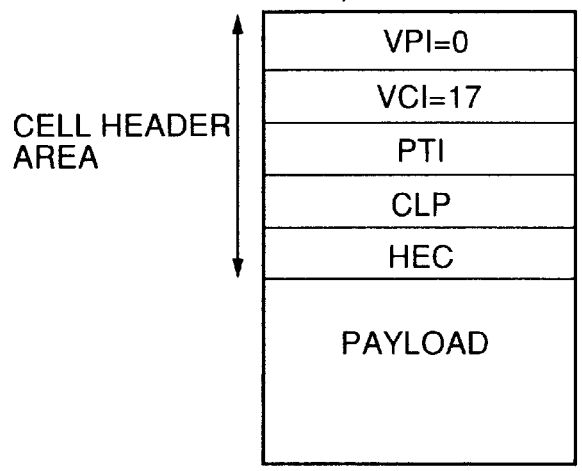
FIGS. 43A to 43C are diagrams showing an example (part 4) of the cell format in the down-flow.
Figure 43B:
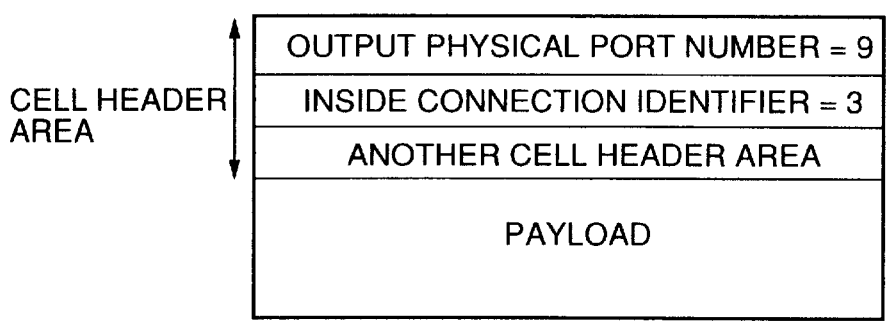
Figure 43C:
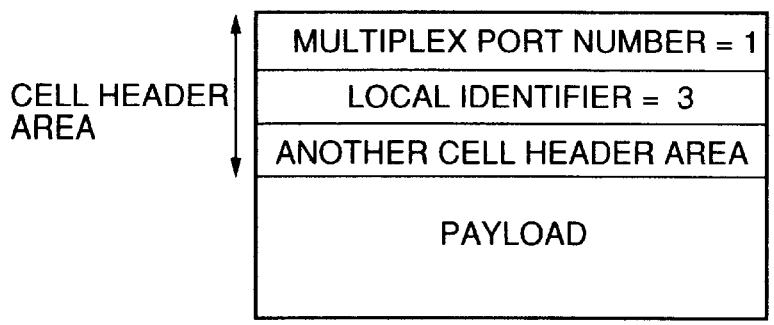

In FIG. 40, when the IP-support frame relay interface 512A which receives the cell from the neighboring node 6 judges that the cell can be communicated on the basis of the redirect VC, it subjects the table of the down-unit 5122 to the registration for enabling reception of the cell on the basis of the redirect VC (FIG. 41A), and generates a redirect message of JFMP (FIG. 41B) for instructing the communication to be switched to the redirect VC and transmits the message to the IP controller 53. In response to this message, the IP controller 53 generates a move branch message of GSMP (FIG. 41C) for setting the connection of the redirect VC between the IP-support frame relay interface 512A and the switch fabric unit 521, and transmits the message to the switch controller 522. In response to this message, the switch controller 522 generates control information (FIGS. 41D and 41E) for the connection setting, and transmits the control information to the cell multiplexing/demultiplexing unit 511 and the up-unit 5231B of the ATM interface, whereby the registration for redirect VC is performed on each table of the down-unit of the cell multiplexing/demultiplexing unit 511 and the up-unit 5231B of the ATM interface, whereby the cut-through in which the IP node 41 and the neighboring node 6 are connected to each other by the redirect VC via no IP controller is established. Thereafter, the switch controller 522 transmits the control information (FIG. 41 F) for releasing the connection to the down-unit 5232A of the ATM interface to release the connection setting of the redirect VC before the switching operation, and notifies the completion of the processing to the IP controller 53 with the move branch reply message.

Next, the communication after the cut-through is established will be described with reference to FIGS. 42 and 43A–43C.

When the cut-through is established, all the communications from the neighboring node 6 to the IP node 41 are performed through no IP controller by the redirect VC. First, the cell from the neighboring node 6 (FIG. 43A) is processed in the ATM interface 523B so that identification information is set in the header portion thereof (FIG. 43B), and then transmitted to the cell multiplexing/demultiplexing unit 511. The cell thus transmitted is converted to the cell having the first multiplex port number set in the cell multiplexing/demultiplexing unit 511 (FIG. 43C), and then transmitted to the IP-support frame relay interface 512A. The cell is converted to the IP packet in the IP-support frame relay interface 512A and the IP address is set, and then it is transmitted to the IP node 41.

The above description is directed to the operation when the communication from the neighboring node 6 to the IP node 41 is performed.

Next, the communication between the cell multiplexing/demultiplexing units 511 which are connected through the switch fabric unit 521 will be described with reference to FIG. 44.

In FIG. 44, IP packets A and B transmitted from two IP nodes which are connected to the same cell multiplexing/demultiplexing unit 511 are subjected to the IP processing in the interfaces 512A and 512B respectively, and then converted to cells. Thereafter, these cells are serially multiplexed on a cell basis in the cell multiplexing/demultiplexing unit 511. As shown in FIG. 44, even when the cellularized IP data A and B are output from the interfaces 512A and 512B at the same timing, they are alternately multiplexed on a cell basis at a predetermined time interval, for example. This cell sequence is transmitted through the switch fabric unit 521 to the cell multiplexing/demultiplexing unit 511 at the transmission destination. In the cell multiplexing/demultiplexing unit 511 at the transmission destination, the cell sequence is divided into cell units, and taken into interfaces 512A' and 512B' at the transmission destination. Thereafter, these cells are reproduced into the IP packets A and B, and transmitted to the transmission path.

Figure 50:
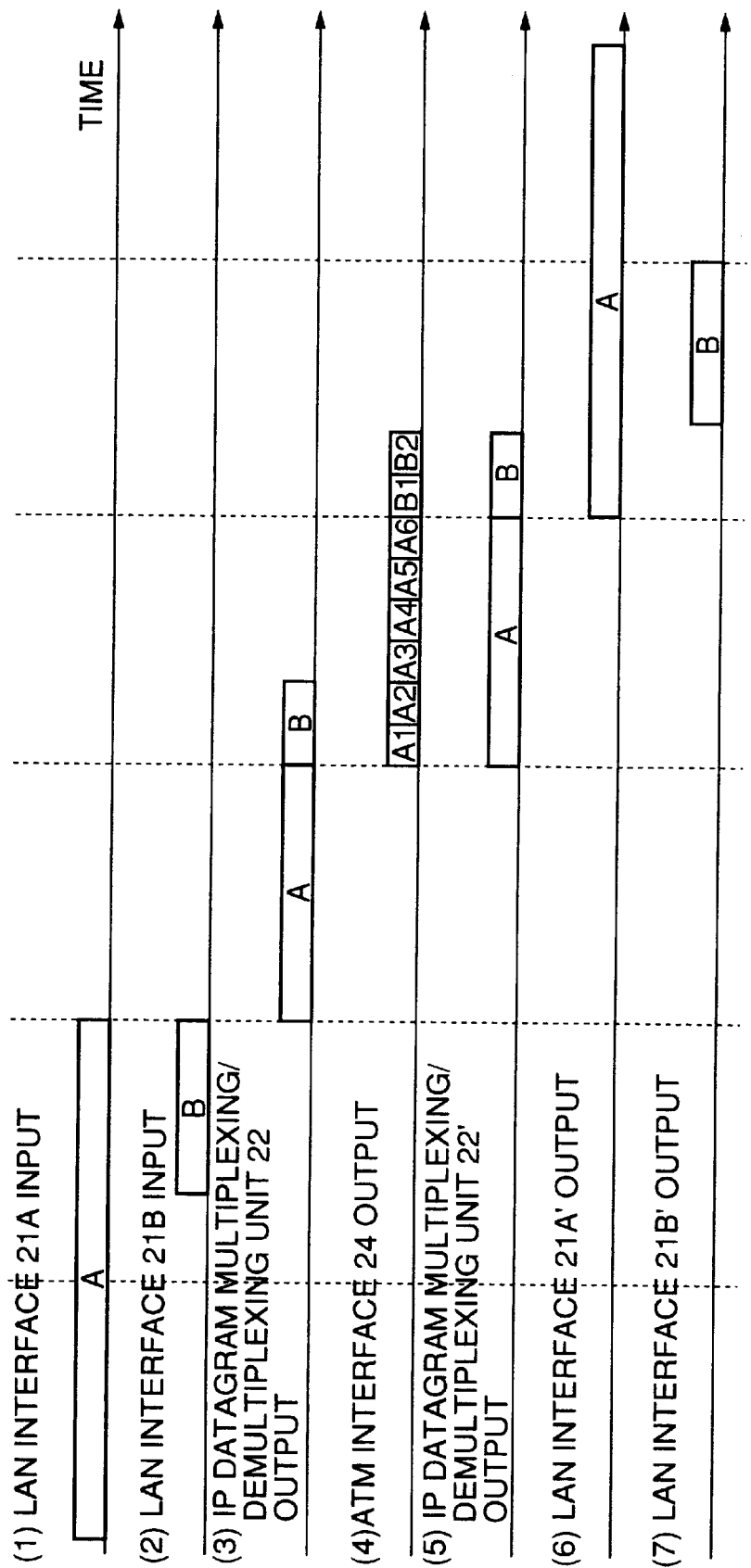
FIG. 50 is a diagram showing an example of packet delay in the prior art.

As is apparent from comparison with FIG. 50, the IP packet B which is multiplexed together with the IP packet A having a large data amount can be communicated with a short delay time in the IP switch 5 with a multiplexer because the IP data are multiplexed as described above. This characteristic is very effective in a public network, etc. which consider fairness in access to be important.

Further, any delay time occurring due to the IP processing is not shown in FIGS. 44 and 50. However, in the IP switch 5 with a multiplexer, each interface which is provided for every transmission path or transmission path group to be multiplexed is provided with a function of performing the IP processing, and thus the communication delay occurring due to the IP processing can be reduced to be less than the method of FIG. 50, whereby the multiplicity of the traffic of the overall system can be enhanced.

Still further, in the IP switch 5 with a multiplexer, the corresponding relationship between various kinds of identification information for the physical ports, the switch ports, etc. is determined as shown in FIG. 5, and the cell is transmitted after the identification information is converted in each kind of interface. Therefore, no reception and transmission for the control information to control the transmission is needed. In addition, even in the IP controller 53, the IP processing can be performed according to general IFMP or GSMP by recognizing the port on the basis of the switch port number.

In the IP switch 5 with a multiplexer as described with reference to FIG. 2, communications of nodes and transmission paths which make communications different from those of the IP nodes 41 can be multiplexed and switched. Next, the interfaces 513 to 517 of FIG. 2 will be described in detail.

Figure 45:
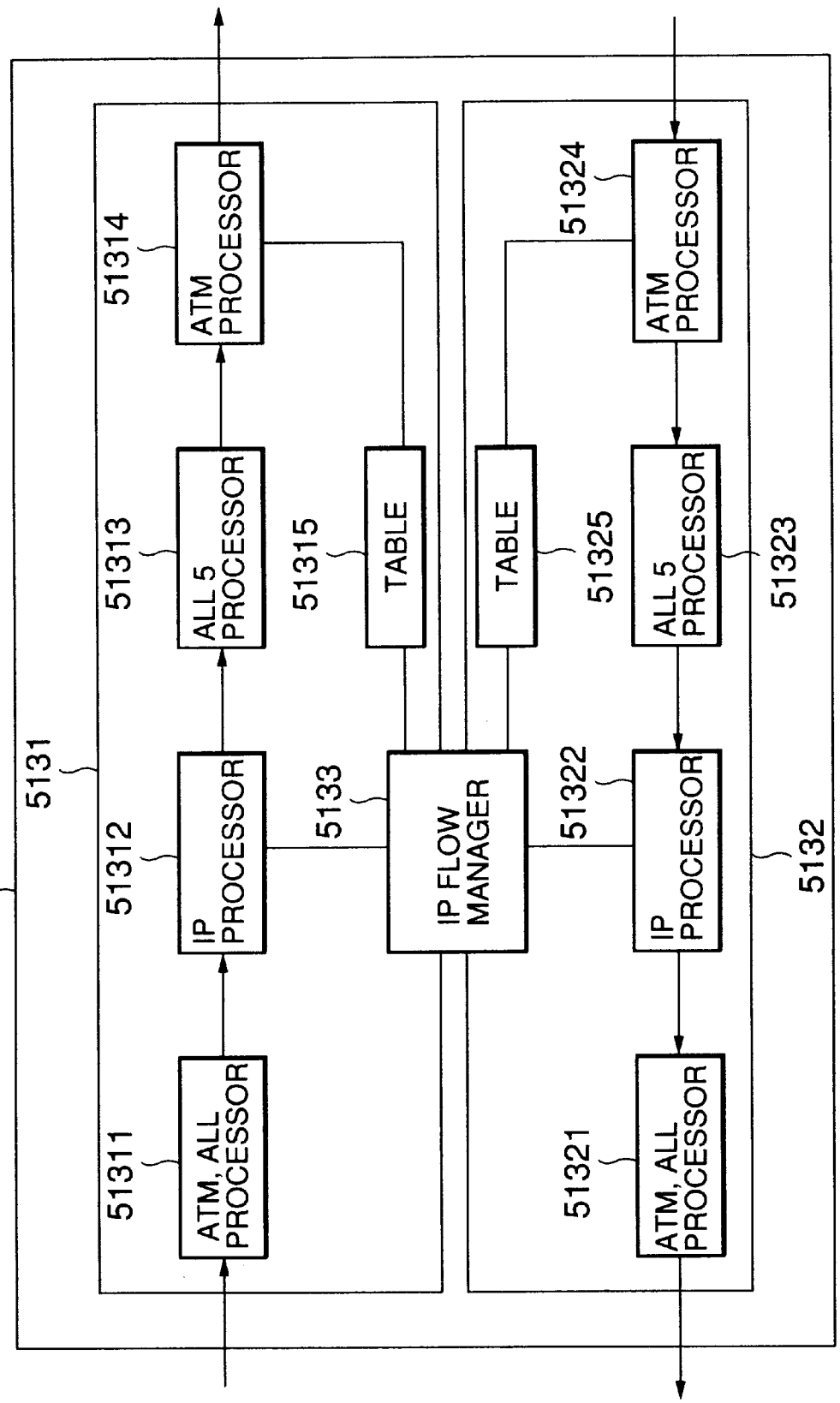
FIG. 45 is a diagram showing an example of the constitution of an IP-support low-speed ATM interface.

FIG. 45 shows the constitution of an IP-support low-speed ATM interface 513.

The IP-support low-speed ATM interface 513 is connected to a transmission path of an IP node (ATM) 42 which has an IP as a protocol of a network layer and communicates information of IP packets with ATM cells at a low speed. As shown in FIG. 45, the interface 513 has such a structure that the frame processors 51211 and 51221 are replaced by ATM/ALL processors 51311 and 51321. In this constitution, the ATM/ALL processor 51311 of the up-unit 5131 performs reception processing on an ATM cell which is transmitted from a transmission path at a low speed, and reproduces an IP packet from the ATM cell and transmits it to the IP processor 51312. The subsequent processing of the IP processor, the ALL 5 processor and the ATM processor is the same as the interface 512 of FIG. 6. Likewise, the same processing as the interface 512 of FIG. 6 is performed in the IP processor, the ALL 5 processor and the ATM processor to generates the (P packet which is processed in the IP processor 51322. The ATM/ALL processor 51321 converts the IP packet to the ATM cell and then transmits the ATM cell to the transmission path at a low speed. In the IP switch 5 with a multiplexer, the same IP processing and switching as the cell which is communicated in the above IP-support frame relay interface 512 is performed on the cell communicated through the interface 513.

Figure 46:
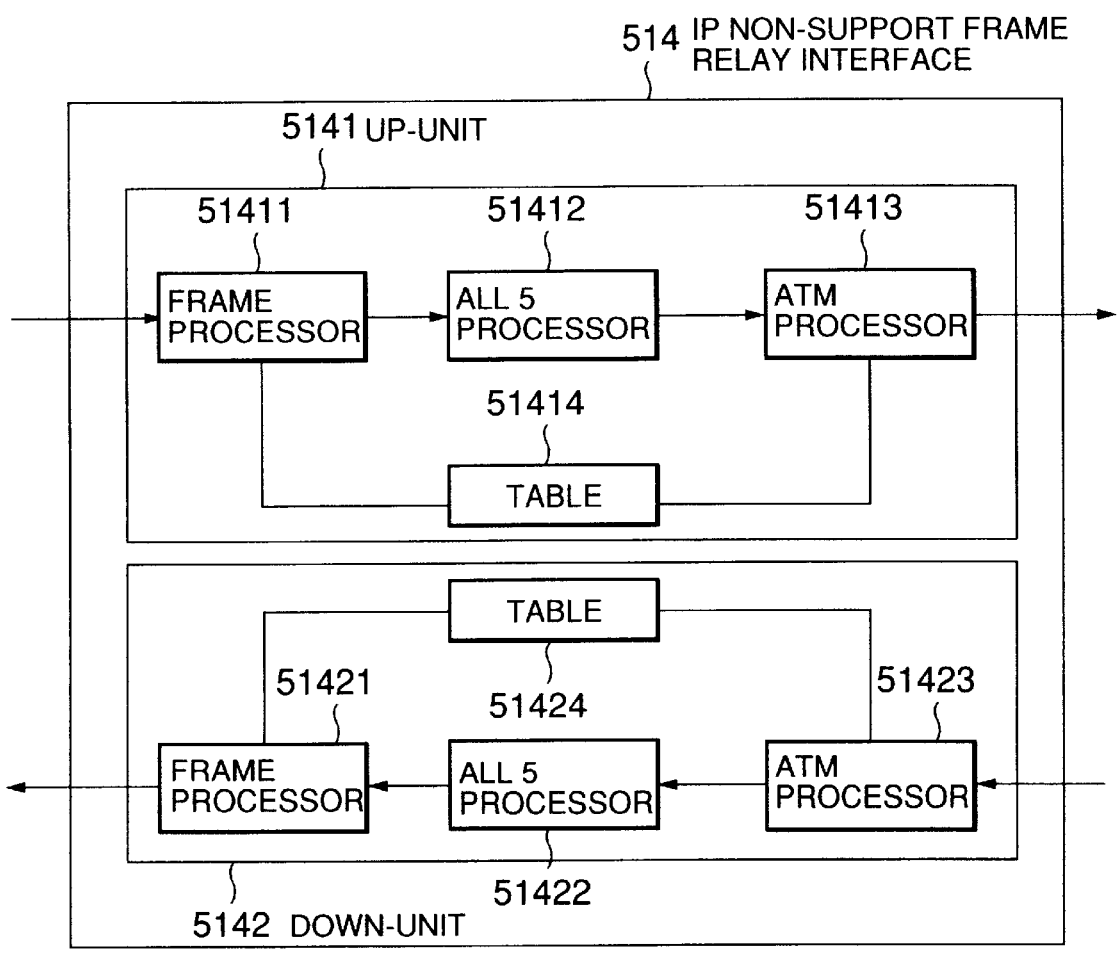
FIG. 46 is a diagram showing an example of the constitution of an IP non-support frame relay interface.

FIG. 46 shows the constitution of the IP non-support frame relay interface 514.

The IP non-support frame relay interface 514 is connected to the transmission path of a non-IP node 43 which has no IP and performs communication based on frame relay. The interface 514 has such a structure that the IP processor and the IP flow manager are excluded from the IP-support frame relay interface 512 of FIG. 6 because it is unnecessary to perform the processing on the IP. In this constitution, the frame processor and the ATM processor perform the conversion processing of the identification information of the packet and the ATM cell according to the registration content of the table. The cell communicated in the interface 514 is directly switched and transmitted via no IP controller 53.

The IP non-support low-speed ATM interface 515 is connected to the transmission path of a non-IP node (ATM) 44 which has no IP and communicates ATM cells. The interface 515 comprises a circuit (not shown) for converting the communication speed of the ATM cells between the non-IP node (ATM) 44 and the cell multiplexing/demultiplexing unit 511. The cell which is communicated in this interface 515 is directly switched and transmitted through no IP controller 53.

The IP non-support low-speed ATM interface 516 of FIG. 2 is connected to the transmission path of the IP node (ATM) 45 which has IP and communicates ATM cells at a low speed. This interface 516 comprises a circuit (not shown) for converting the communication speed of ATM cells and the message of IMFP between the IP node (ATM) 45 and the cell multiplexing/demultiplexing unit 511. The IP processing is performed in the IP node (ATM) 45. The IP node (ATM) 3 connected to the physical port of the ATM switch 52 performs the IP processing in the node thereof in FIG. 2 to perform a normal ATM communication.

Figure 47:
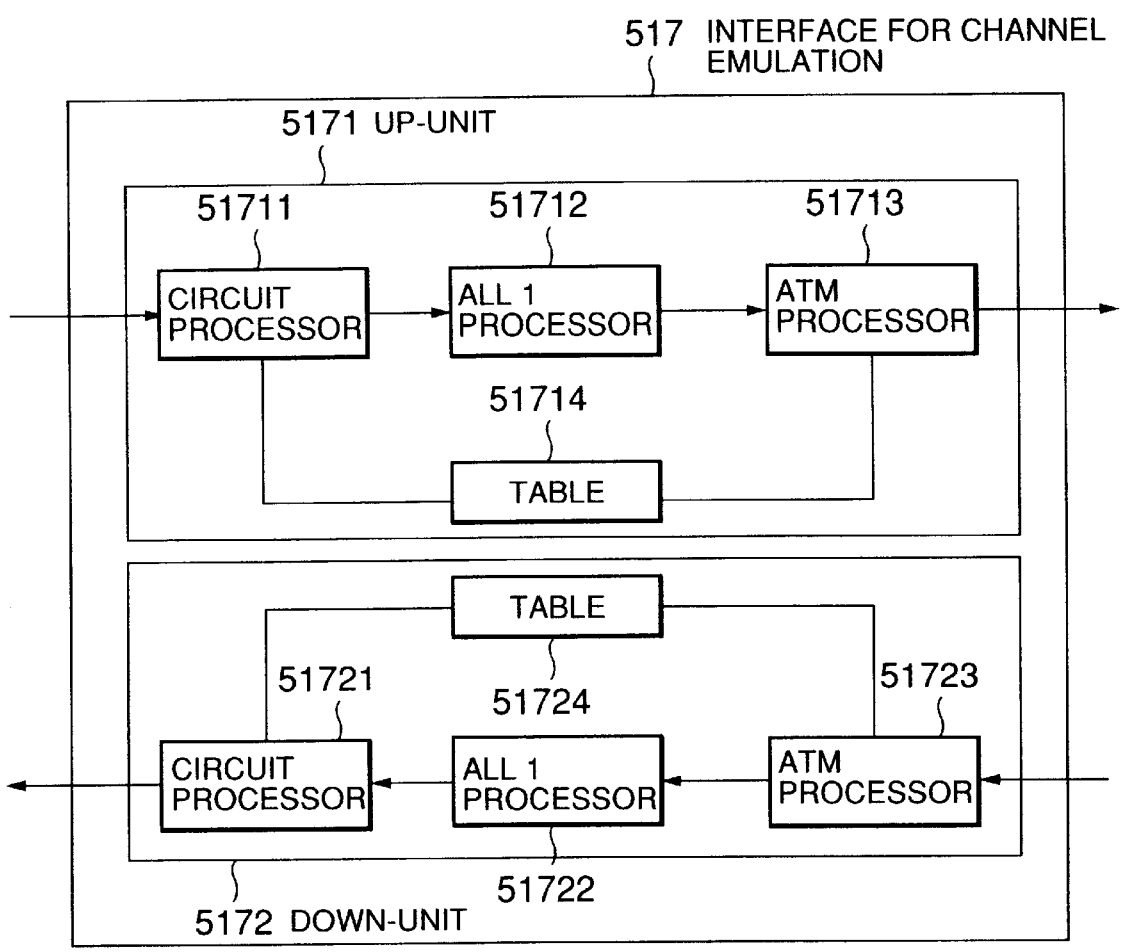
FIG. 47 is a diagram showing an example of the constitution of an interface for channel emulation.

FIG. 47 shows the constitution of the interface 517 for channel emulation.

The interface 517 for channel emulation is connected to the line transmission of the channel switching node 46. As shown in FIG. 47, each of the up-unit 5171 and the down-unit 5172 of the interface 517 comprises a line processor, an ALL1 processor, an ATM processor and a table. Signals which are transmitted from the line transmission path are subjected to reception processing and address conversion processing in the line processor 51711, and then converted to ATM cells by the protocol processing of ALL type 1 in the ALL1 processor 51712. The ATM cells thus converted are added to identification information in the ATM processor, and then transmitted to the cell multiplexing/demultiplexing unit 511. Further, the ATM cells which are transmitted from the cell multiplexing/demultiplexing unit 511 are subjected to the reception processing in the ATM processor 51723, and then converted to signals of the line transmission path in the ALL1 processor 51722. Thereafter, the signals are subjected to the address conversion processing in the line processor, and transmitted to the line transmission path. The address conversion processing in the line processor and the ATM processor is performed according to the registration content of the table.

As described above, the IP switch 5 with a multiplexer can support various services such as frame relay, low-speed ATM, channel emulation, etc. as well as the IP packet service, and thus the networks can be operated in a flexible manner. Further, the cells which are communicated between each of the interfaces 513 to 517 and each multiplexer 51, which enables these services, have the same format as the cells communicated in the IP-support frame relay interface 512. Therefore, in the cell multiplexing/demultiplexing unit 511, it is unnecessary to pay attention to the type of the connected interface, and the transmission of ATM cells according to the identification information and the conversion of the identification information may be merely performed. Likewise, with respect to the IP processor 53, it is also unnecessary to pay attention to the number of multiplexers 51 and the type of the interface connected thereto, and it is sufficient to merely recognize a node to be IP-processed on the basis of the switch port number to perform the IP processing based on general IFMP and GSMP. These characteristics enable the IP switch 5 with a multiplexer to be easily modified and expanded in constitution.

As described above, according to the present invention, there can be provided the router apparatus which can enhance the multiplicity of communications which are performed through the ATM switch. Further, there can also be provided the router apparatus which can reduce the communication delay variation between the communications to be multiplexed. Still further, there can be provided the router apparatus which can support various types of communications.

What is claimed is:

1. A packet switching device comprising:
   a plurality of first interface units each of which receives a variable length packet and converts the packet to a first plurality of fixed length cells, each of the cells possessing information corresponding to a destination of the packet thus received;
   a cell multiplexing unit which multiplexes said first plurality of fixed length cells received from said plurality of first interface units, and outputs plural number of cell strings comprising said first plurality of fixed length cells;
   a switching unit which has a plurality of input ports and a plurality of output ports, and switches and outputs said first plurality of fixed length cells received from said plurality of input ports to any one of said plurality of output ports, in accordance with said information possessed by said first plurality of fixed length cells;
   an IP controller which assembles said first plurality of cells to said variable length packet, the cells being received from said cell strings, as outputs from said multiplexing unit via said switching unit, performs a layer 3 processing on said variable length packet, disassembles said packet thus processed to a second plurality of fixed length cells, and outputs said second plurality of fixed length cells to said switching unit; and
   a plurality of second interface units each of which outputs either of said first plurality of fixed length cells and said second plurality of fixed length cells, having been switched in said switching unit, to a node as a destination of said variable length packet.

2. A packet switching device as described in claim 1, wherein each of said plurality of first interface units comprises:
   a table which registers identifying information to identify said variable length packet thus received;
   decision means which outputs said first plurality of fixed length cells so as to be transferred to any one of said second interface units through a first path via said switching unit if the identifying information of the packet thus received is registered in said table, and outputs said first plurality of fixed length cells so as to be transferred to said IP controller through a second path via said switching unit if the identifying information of the packet thus received in not registered in said table.

3. A packet switching device as described in claim 2, wherein said identifying information includes a network address.

4. A packet switching device comprising:
   a plurality of first interface units each of which receives a variable length packet and converts the packet to a first plurality of fixed length cells, each of the cells possessing information corresponding to a destination of the packet thus received;
   a cell multiplexing unit which multiplexes said first plurality of fixed length cells received from said plurality of first interface units, and outputs plural number of cells strings comprising said first plurality of fixed length cells;
   a switching unit which has a plurality of input ports and a plurality of output ports, and switches and outputs said first plurality of fixed length cells received from said plurality of input ports to any one of said plurality of output ports, in accordance with said information possessed by said first plurality of fixed length cells;
   an IP controller which assembles said first plurality of cells to said variable length packet, the cells being received from said cell strings, as outputs from said multiplexing unit via said switching unit, performs a layer 3 processing on said variable length packet, disassembles said packet thus processed to a second plurality of fixed length cells, and outputs said second plurality of fixed length cells to said switching unit; and
   a plurality of second interface units each of which outputs either of said first plurality of fixed length cells and said second plurality of fixed length cells, having been switched in said switching unit, to a node as a destination of said variable length packet,
   wherein said IP controller communicates with a destination node using said second plurality of fixed length cells and when the destination of the packet thus received is confirmed, sets up said first interface units or the cell multiplexing unit so that when a packet having the same identifying information as the packet thus received is newly received by the packet switching device, the newly received packet is transferred by said switching unit to the destination node without using said IP controller.

5. A packet switching device as described in claim 4, wherein said IP controller confirms the destination of the packet thus received and thereafter transmits via said switching unit a third plurality of cells containing control information required for setting up said first interface units or the cell multiplexing unit.

6. A packet switching device comprising:

- a plurality of first interface units each of which receives a variable length packet and converts the packet to a first plurality of fixed length cells, each of the cells possessing information corresponding to a destination of the packet thus received;
- a cell multiplexing unit which multiplexes said first plurality of fixed length cells received from said plurality of first interface units, and outputs plural number of cell strings comprising said first plurality of fixed length cells;
- a switching unit which has a plurality of input ports and a plurality of output ports, and switches and outputs said first plurality of fixed length cells received from said plurality of input ports to any one of said plurality of output ports, in accordance with said information possessed by said first plurality of fixed length cells;
- an IP controller which assembles said first plurality of cells to said variable length packet, the cells being received from said cell strings, as output from said multiplexing unit via said switching unit, performs a layer 3 processing on said variable length packet, disassembles said packet thus processed to a second plurality of fixed length cells, and outputs said second plurality of fixed length cells to said switching unit;
- a plurality of second interface units each of which outputs either of said first plurality of fixed length cells and said second plurality of fixed length cells, having been switched in said switching unit, to a node as a destination of said variable length packet; and
- a switch controller which controls said switching unit,
- wherein said IP controller outputs a first message when it is determined that a cut-through of said cell is available,
- wherein said switching unit outputs control information for the cut-through in accordance with the first message from said IP controller,
- wherein said cell multiplexing unit registers in a table thereof information for the cut-through in accordance with said controlling information,
- wherein said IP controller outputs a second message for performing the cut-through, and
- wherein said first interface unit registers in said table thereof information for the cut-through in accordance with the second message.

7. A packet switching device as described in claim 6,

- wherein said switching controller outputs a third message in response to said first message, and
- wherein said IP controller outputs said second message for performing the cut-through upon receipt of said third message.

* * * * *